United States Patent
Chen et al.

(10) Patent No.: US 10,571,714 B2
(45) Date of Patent: Feb. 25, 2020

(54) SNAP-FIT FEATURES IN EYEWEAR

(71) Applicant: Advanced Eye Protection IP Holding, Park City, UT (US)

(72) Inventors: Stephen Charles Chen, Park City, UT (US); Chen Chang Wang Lee, Tainan (TW); Zong-Lin Du, Tainan (TW)

(73) Assignee: Advanced Eye Protection IP Holding, Park City, UT (US)

( * ) Notice: Subject to any disclaimer, the term of this patent is extended or adjusted under 35 U.S.C. 154(b) by 0 days.

(21) Appl. No.: 15/895,806

(22) Filed: Feb. 13, 2018

(65) Prior Publication Data

US 2018/0231797 A1 Aug. 16, 2018

Related U.S. Application Data

(60) Provisional application No. 62/459,481, filed on Feb. 15, 2017.

(51) Int. Cl.
  *G02C 5/14* (2006.01)
  *G02C 1/00* (2006.01)
  *G02C 5/02* (2006.01)

(52) U.S. Cl.
  CPC ............... *G02C 1/10* (2013.01); *G02C 5/14* (2013.01); *G02C 5/02* (2013.01); *G02C 2200/04* (2013.01); *G02C 2200/08* (2013.01)

(58) Field of Classification Search
  CPC ...... G02C 5/14; G02C 2200/02; G02C 5/143; G02C 5/22; G02C 2200/06; G02C 2200/10

(Continued)

(56) References Cited

U.S. PATENT DOCUMENTS 5,467,148 A 11/1995 Conway
5,555,038 A 9/1996 Conway
(Continued)

FOREIGN PATENT DOCUMENTS

KR 20160043442 A 4/2016

OTHER PUBLICATIONS

Wiley-x Cqc Goggles w/ 2 interchangeable Lenses 491 Product Info. Source: www.opticsplanet.com/wiley-gg-x-cqc.html. Date accessed Oct. 17, 2016.

(Continued)

*Primary Examiner* — Hung X Dang
(74) *Attorney, Agent, or Firm* — Maschoff Brennan

(57) ABSTRACT

An embodiment includes a snap-fit temple interface of a lens. The snap-fit temple interface includes a first snap-fit feature and a second snap-fit feature. The first snap-fit feature of the lens is configured to be engaged with a first corresponding snap-fit feature of a temple assembly. The first snap-fit feature is configured to be engaged with the first corresponding snap-fit feature by a first movement of the lens in a first direction relative to the temple assembly followed by a second movement of the lens in a second direction relative to the temple assembly. The second snap-fit feature of the lens is configured to be engaged with a second corresponding snap-fit feature of the temple assembly. The second snap-fit feature is configured to be engaged with the second snap-fit feature by the second movement of the lens in the second direction relative to the temple assembly. The first direction is substantially perpendicular to the second direction.

19 Claims, 16 Drawing Sheets

(58) Field of Classification Search
USPC .................................. 351/116, 110, 111, 153
See application file for complete search history.

(56) References Cited

U.S. PATENT DOCUMENTS

| | | | |
|---|---|---|---|
| 5,946,072 A * | 8/1999 | Canavan ............. | G02C 5/2263 |
| | | | 351/110 |
| 6,138,286 A | 10/2000 | Robrahn et al. | |
| 6,959,988 B1 | 11/2005 | Sheldon | |
| 7,241,007 B2 | 7/2007 | Thomas | |
| 7,712,896 B1 * | 5/2010 | Lee ......................... | G02C 5/22 |
| | | | 16/228 |
| 8,550,619 B2 | 10/2013 | Walker, Jr. et al. | |
| 8,746,877 B2 | 6/2014 | Belbey et al. | |
| 9,192,519 B2 | 11/2015 | Tobia | |
| 9,279,999 B1 | 3/2016 | Weng et al. | |
| 9,463,117 B2 | 10/2016 | Belbey et al. | |
| 2009/0027616 A1 | 1/2009 | Sheldon | |
| 2015/0049294 A1 | 2/2015 | Chin | |
| 2015/0177521 A1 | 6/2015 | Abdollahi et al. | |

OTHER PUBLICATIONS

Bobster Phoenix Over the Glass Interchangeable Goggle. Source: www.chaparral-racing.com/product/bobster-phoenix-over-the-glass-interchangeable-goggle/350-9260.aspx Date accessed: Oct. 17, 2016.
Tifosi Eyewear Pro Escalate Full and Half Interchangeable Sunglasses. Source: www.wheelies.co.uk/p94862/Tifosi-Eyewear-Pro-Escalate-Full-and-Half-Interchangeable-Sunglasses.aspx. Date accessed: Oct. 24, 2016.

* cited by examiner

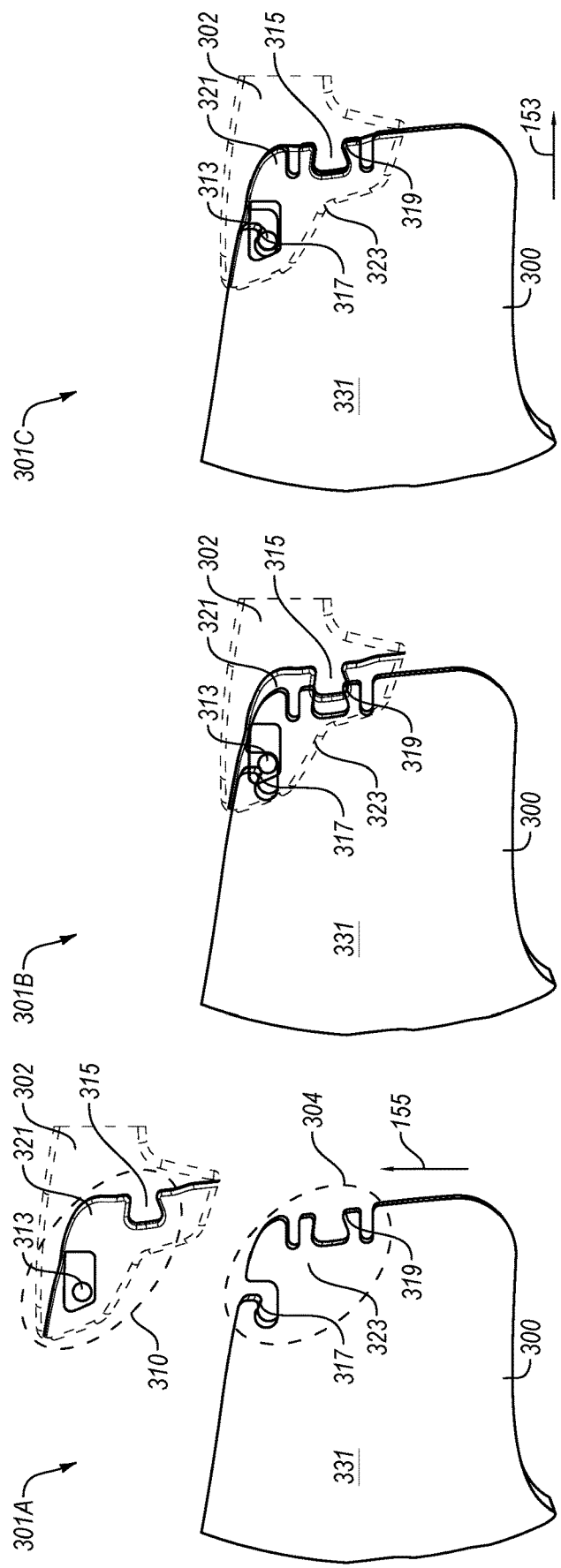

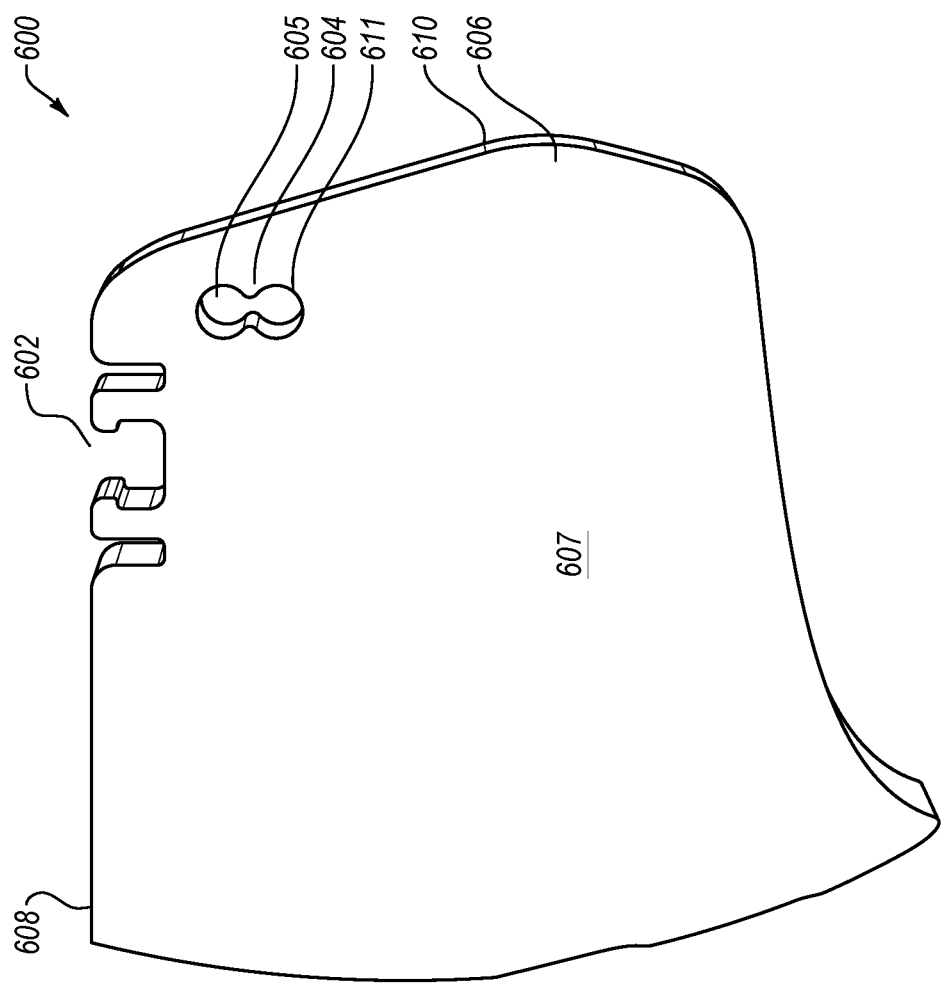
FIG. 6A
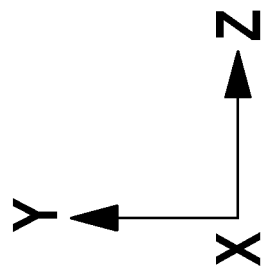

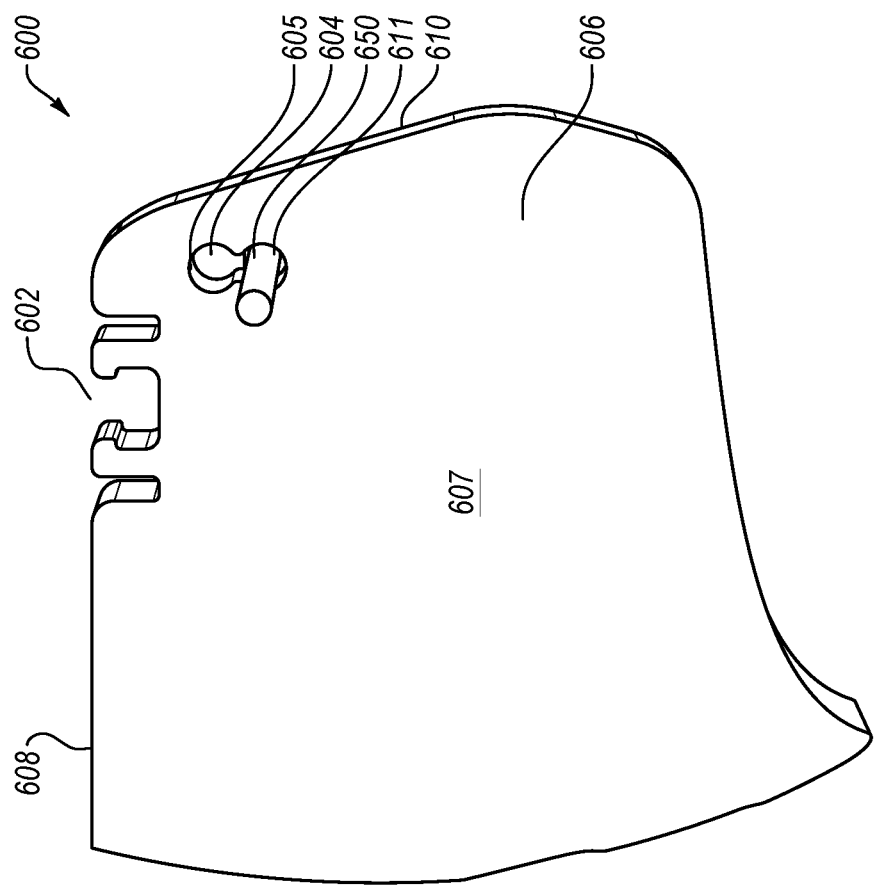
FIG. 6B
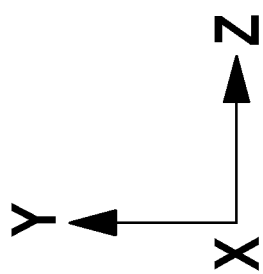

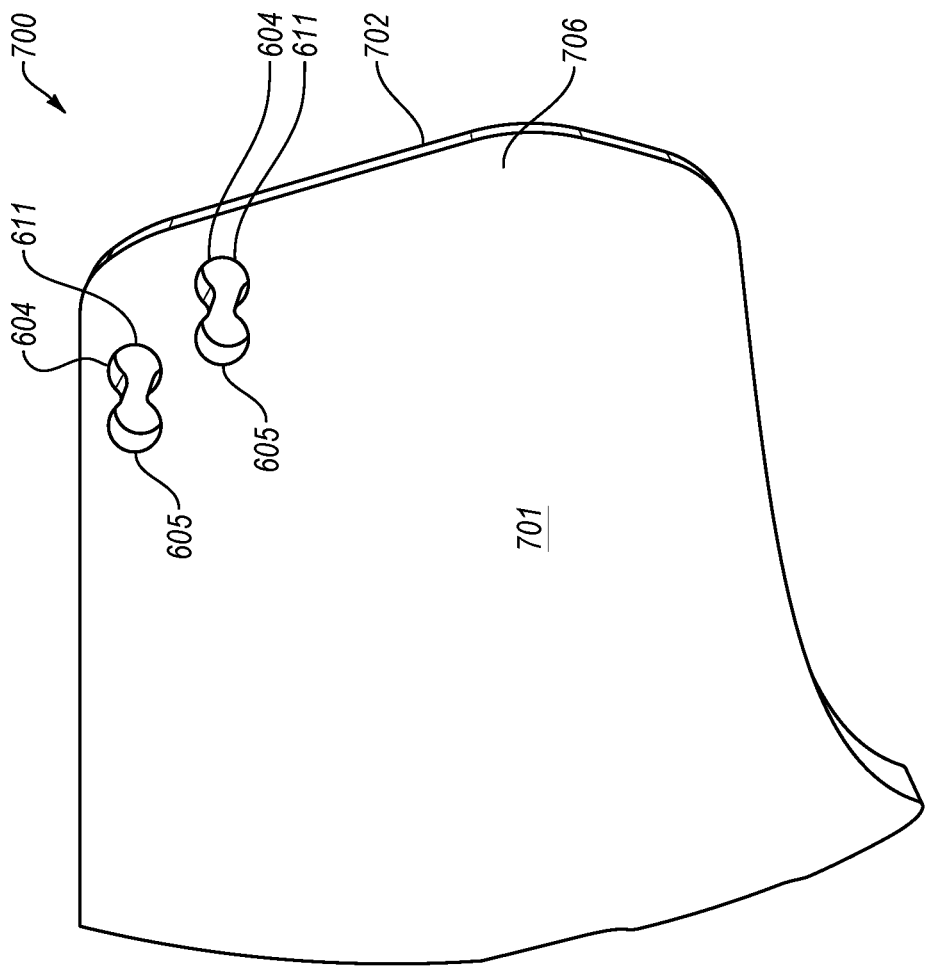
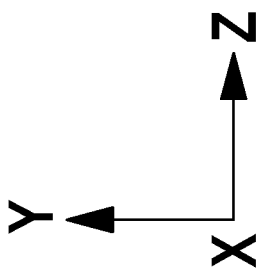
FIG. 7A

SNAP-FIT FEATURES IN EYEWEAR

CROSS-REFERENCE TO RELATED APPLICATION

This application claims priority to and the benefit of U.S. Provisional Application No. 62/459,481, filed Feb. 15, 2017, which is incorporated herein by reference in its entirety.

FIELD

Embodiments disclosed in the present disclosure relate to eyewear and interfaces between lenses, temple assemblies, and brow pieces. In particular, some embodiments described in the present disclosure relate to snap-fit features that retain lenses relative to the brow pieces and/or the temple assemblies.

BACKGROUND

In eyewear, various interfaces are implemented to retain a lens relative to a brow piece and/or one or more temple assemblies. In some eyewear, the lens or lenses are fixed relative to the brow piece and/or the temple assemblies. For instance, during an intended use of the eyewear the lens or lenses are intended to remain fixed to the brow piece and/or the temple assemblies. In this type of eyewear, fasteners such as screws or rivets may be used to retain the lens relative to the brow piece and/or the temple assemblies. Alternatively, a portion of the brow piece and/or the temple assembly may surround or substantially surround the lens or lenses, which retain the lens in a permanent or substantially permanent position.

In other eyewear, the lens or the lenses are intended to be interchangeable. As used in the present disclosure, interchangeable may relate to any eyewear configured such that an end user may remove one or more lenses from a brow piece and/or a temple assembly and another one or more lenses may be substituted therefor. Generally, eyewear with interchangeable lenses does not require use of tools. For instance, a single brow piece and/or set of temple assemblies may be configured to receive multiple lenses. The multiple lenses may be different colors, thicknesses, etc., for example, which may be suitable in response to different ambient lighting conditions or applications. Additionally or alternatively, lenses may become damaged, and interchangeability may decrease replacement times and enable a user to upgrade as lens technology improves.

In safety glasses or protective eyewear, interfaces between the lens or lenses and the brow piece and/or temple assemblies may be subject to stress. For example, an impact on the lens of the protective eyewear may result in physical deformation of the lens and/or the frames, which may result in disengagement of the lens from the brow piece and/or temple assemblies. In dangerous (e.g., military, police, emergency, or tactical) circumstances, the disengagement between the lens and the brow piece and/or temple assemblies may result in harm to the user. For example, the eyes of the user may be exposed during the time in which the lens is disengaged from the brow piece and/or temple assemblies.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

According to an aspect of an embodiment, a snap-fit temple interface of a lens may include a first snap-fit feature and a second snap-fit feature. The first snap-fit feature of the lens may be configured to be engaged with a first corresponding snap-fit feature of a temple assembly. The first snap-fit feature may be configured to be engaged with the first corresponding snap-fit feature by a first movement of the lens in a first direction relative to the temple assembly followed by a second movement of the lens in a second direction relative to the temple assembly. The second snap-fit feature of the lens may be configured to be engaged with a second corresponding snap-fit feature of the temple assembly. The second snap-fit feature may be configured to be engaged with the second snap-fit feature by the second movement of the lens in the second direction relative to the temple assembly. The first direction may be substantially perpendicular to the second direction.

Another aspect of an embodiment includes eyewear comprising a lens and a brow piece. The lens may include a female snap-fit feature that is defined in a central portion of a top edge of the lens. The female snap-fit feature may include two hook-shaped protrusions, two exterior concave portions, and a central concave portion. The hook-shaped protrusions may be positioned between the two exterior concave portions and the central concave portion. The hook-shaped protrusions may define the dimensions of the central concave portion. The two exterior concave portions may be configured to allow deflection of the hook-shaped protrusions. In detail, an aspect ratio of a distance between the hook-shaped protrusions to a height of the hook-shaped protrusions is configured to minimize bending of corresponding male snap-fit feature of the brow piece configured for engagement with the female snap-fit feature in a direction away from the central concave portion.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which:

FIGS. 3A-3C illustrate an example engagement process that may be implemented between snap-fit temple interfaces and temple assemblies;

FIGS. 6A-6C illustrate another example snap-fit temple interface that may be engaged according to the process of FIGS. 3A-3C;

FIGS. 7A and 7B depict another example snap-fit temple interface that may be engaged according to the process of FIGS. 3A-3C;

DESCRIPTION OF SOME EXAMPLE EMBODIMENTS

Figure 1A:
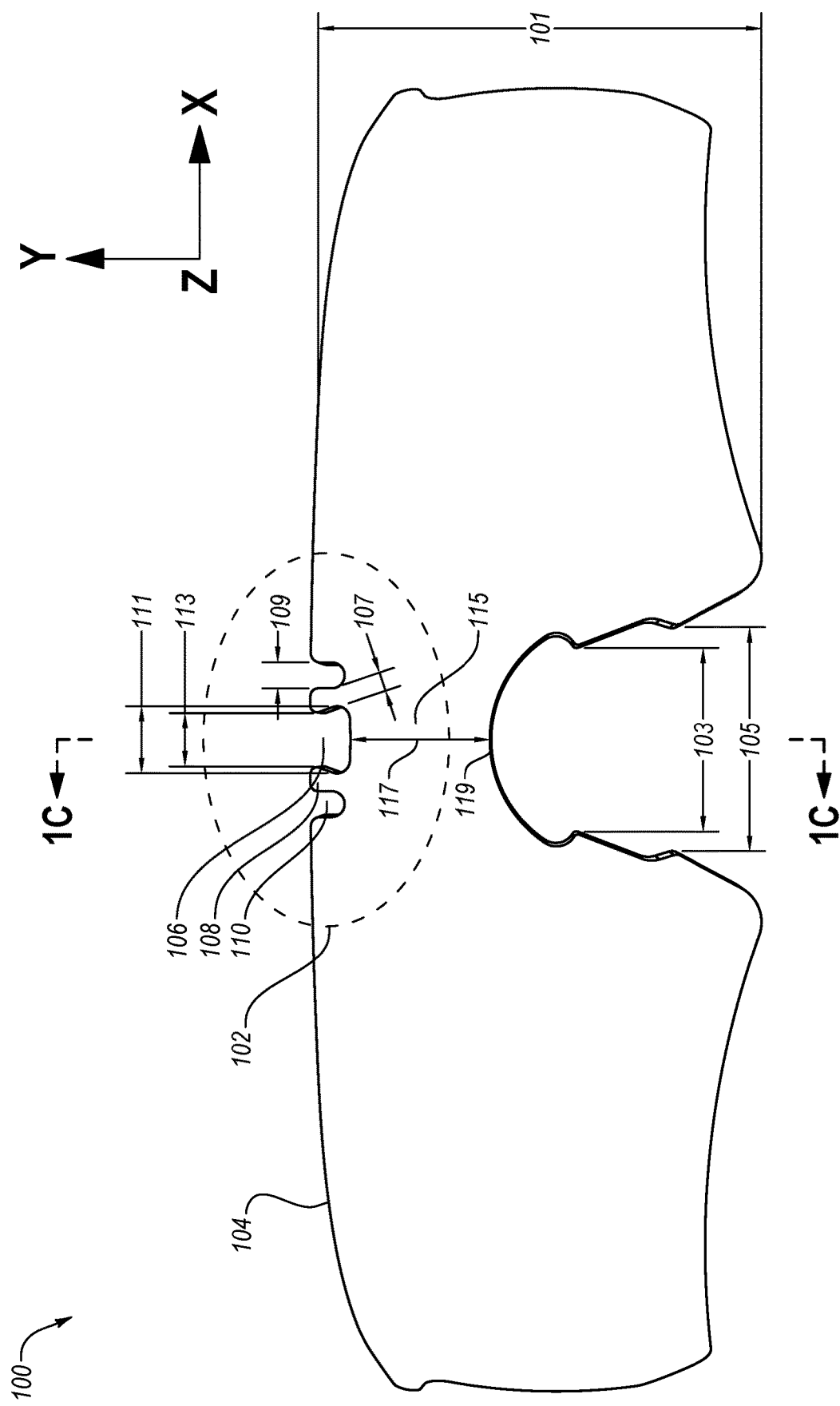
FIG. 1A illustrates an example first lens having an example female snap-fit feature.

In safety glasses or protective eyewear, interfaces between the lens or lenses and the brow piece and/or temple assemblies may be subject to stress. For example, an impact on the lens of the protective eyewear may result in physical deformation of the lens and/or the frame of the eyewear that may result in disengagement of the lens from the brow piece and/or temple assemblies. In dangerous (e.g., military, police, emergency, or tactical) circumstances, the engagement between the lens and the brow piece and/or temple assemblies may result in harm to the user.

Accordingly, some embodiments described in the present disclosure are related to snap-fit features implemented in the lens or lenses of eyewear and in particular protective eyewear. The snap-fit features may enable interchangeability of the lens or lenses while maintaining the engagement between the lens or the lenses and the brow piece and/or temple assemblies following an impact or another cause of physical deformation of the lens(es) and/or the frame.

As used in the present disclosure, a snap-fit feature includes a structure having one or more flexible parts that are configured to interlock with complimentary, corresponding parts of another snap-fit feature. Connections between corresponding snap-fit features (snap-fit or snap-fit connections) may be formed by pressing or otherwise applying a force such that the flexible parts of at least one of the snap-fit features is temporarily displaced. The snap-fit features are moved relative to one another such that a first of the snap-fit features is interlocked with the corresponding snap-fit feature. Examples of snap-fit features may include cantilever, torsional and annular snap-fit features.

An example embodiment may include eyewear with an interchangeable lens or interchangeable lenses. The interchangeable lens may be snap-fit to one or more other features of the eyewear. The eyewear may include a lens, a nosepiece, and two temple assemblies. The eyewear may also include a brow piece that may be physically coupled to the two temple assemblies or may be separate from the two temple assemblies. The nosepiece may be configured to secure the lens on a face of a user. Each of the two temple assemblies may be configured to secure to side edges and top edges of lens.

Each temple assembly may include one or more interlocking or snap-fit features. The side edges and the top edges of lens may have corresponding snap-fit or interlocking features/geometries. The snap-fit features of the temple assembly are configured to attach the temple assemblies to the side edges and/or the top edge of a lens by interlocking in multiple (at least two) directions to the corresponding features on the perimeter of the lens. Interlocking the snap-fit features in multiple directions provide engagement with the lens in at least two different directions to prevent or reduce lens dislodgement or disengagement from the temple assemblies. The at least two different directions may be substantially perpendicular to one another.

The snap-fit or interlocking features on the lens may have a "fork-shaped" geometry that allows the lens material to deflect for engagement with the temple pieces. In embodiments that include the brow piece, the brow piece may include a protrusion that is configured to be retained in a snap-fit feature defined in the lens. The snap-fit feature defined in the lens has the "fork-shaped" geometry that allows the lens material to deflect for engagement with the brow piece.

In another example embodiment, eyewear may include an interchangeable lens or lenses. The eyewear includes a lens, a nosepiece, and two temple assemblies, and in some embodiments a temple piece. The nosepiece may be configured to secure the lens. The two temple assemblies may be configured to secure to the side edges and top edges of lens. Each temple assembly includes multiple interlocking or snap-fit features configured to attach the temple assemblies/frame by interlocking in multiple directions on the perimeter of the lens. The lens/lenses include multiple snap-fit or interlocking features/geometries in multiple directions on the lens that allow the temple assemblies to be attached to the lens. The interlocking snap-fit features, oriented in multiple directions, provide engagement between the lens and frame in different directions to prevent or reduce lens dislodgement from the temple assemblies.

Reference will now be made to the drawings to describe various aspects of some embodiments. The drawings are diagrammatic and schematic representations of the embodiments, and are not meant to be limiting, nor are they necessarily drawn to scale. Throughout the drawings, like numbers generally reference like structures unless described otherwise.

In the following paragraphs and associated figures, example embodiments of lenses are described and depicted. It may be understood with the benefit of this disclosure that the snap-fit features defined in the lenses correspond to matching features on the brow piece and/or temple assemblies. Additionally, the remaining portions of the eyewear are not depicted. A description of eyewear and protective eyewear, which may be suitable in some embodiments described in the present disclosure may be found in application Ser. No. 14/029,563 now U.S. Pat. No. 9,122,079, which is incorporated herein by reference in its entirety.

Figure 1B:
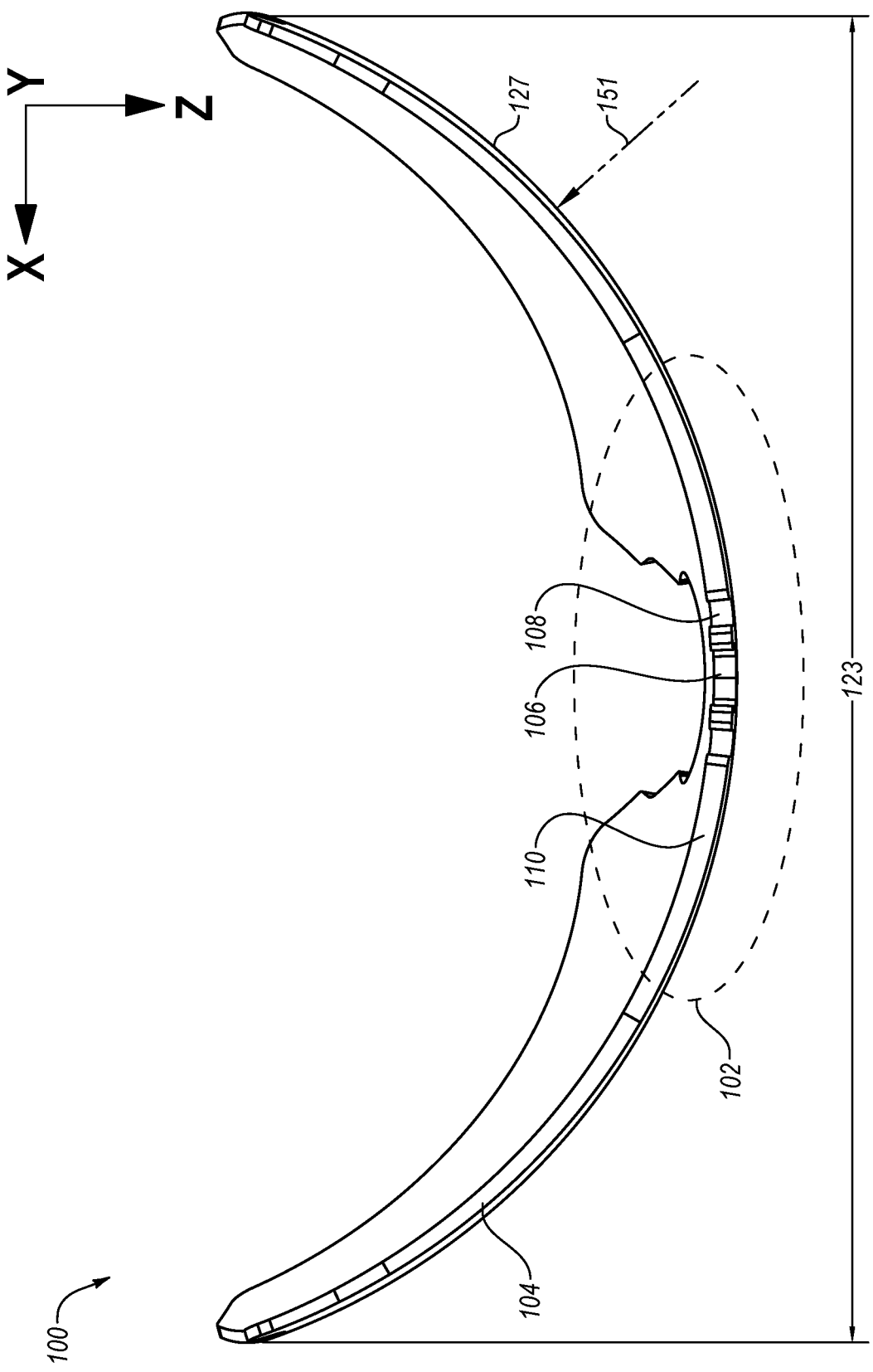
FIG. 1B illustrates another view of the first lens of FIG. 1A.
Figure 1C:
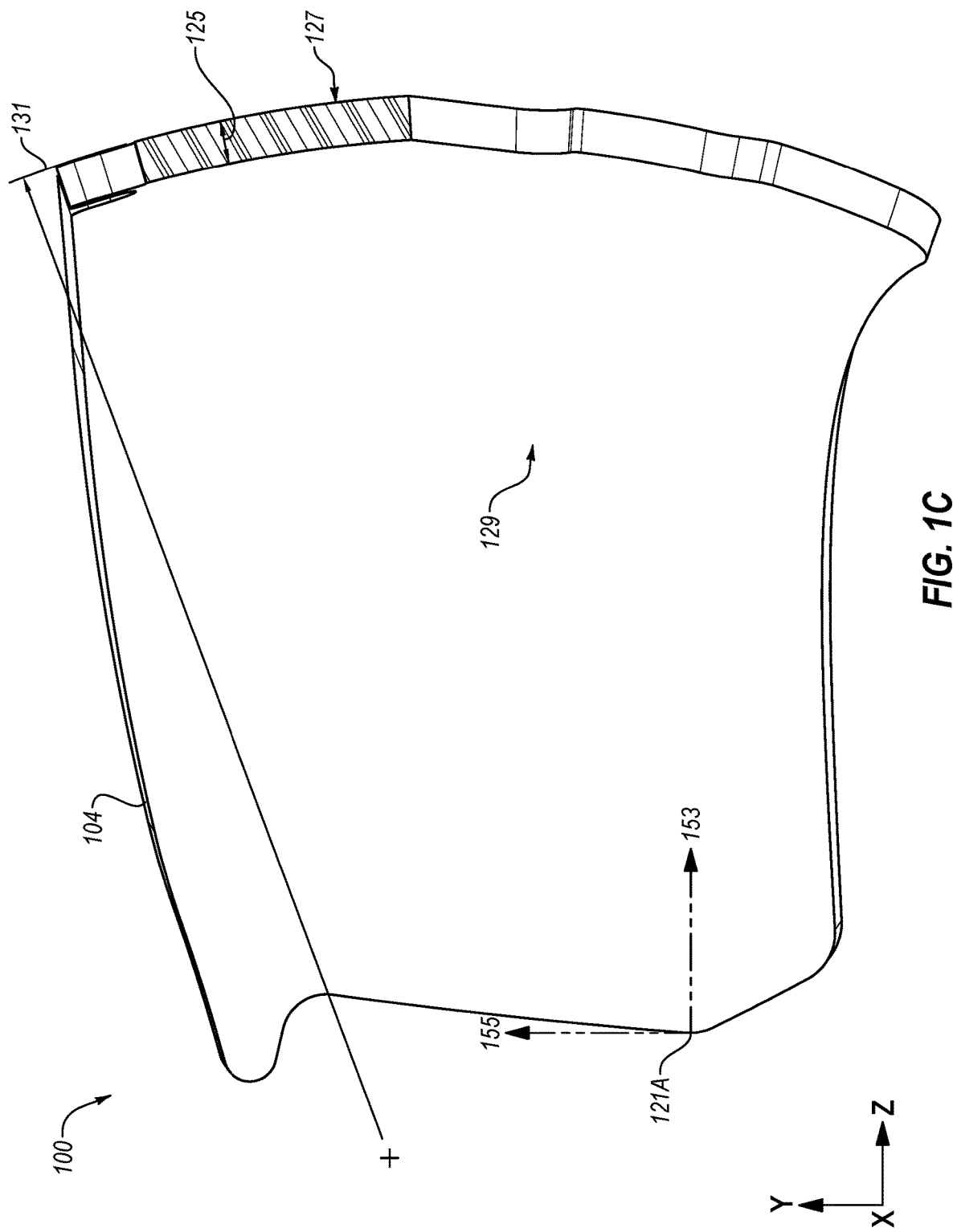
FIG. 1C illustrates another view of the first lens of FIG. 1A.

FIGS. 1A-1C illustrate an example first lens 100. FIG. 1A depicts a front view of the first lens 100. FIG. 1B depicts a top view of the first lens 100. FIG. 1C depicts a side view of the first lens 100. The first lens 100 may include a female snap-fit feature 102. The female snap-fit feature 102 may be defined on a top edge 104 in a central portion of the lens 100. The female snap-fit feature 102 may include a fork-type snap-fit feature.

The female snap-fit feature 102 may include a central concave portion 106. The central concave portion 106 may be configured to accept the male snap-fit feature of a frame of eyewear implementing the first lens 100. For example, the male snap-fit feature may include a rounded rectangle that may include lateral protrusions.

The female snap-fit feature 102 may also include two hook-shaped protrusions 108 and two exterior concave portions 110. The hook-shaped protrusions 108 may be positioned between the two exterior concave portions 110 and the central concave portion 106. The hook-shaped protrusions 108 may define the dimensions (e.g., depth and width) of the central concave portion 106.

The two exterior concave portions 110 allow deflection of the hook-shaped protrusions 108. For instance, in the depicted embodiment, the two exterior concave portions 110 allow deflection of the hook-shaped protrusions 108 in the x direction and the negative x direction in the arbitrarily defined coordinate system of FIGS. 1A-1C. The deflection may facilitate the snap-fit engagement of the male snap-fit feature of the frame in the female snap-fit feature 102.

The deflection may be important for impact-resistant eyewear with greater lens thicknesses. For example, the deflection may be important in eyewear with lens thicknesses about 2.5 millimeters (mm) or larger and that includes or implements a rigid frame material such as high-impact nylon or another suitable rigid material. In impact-resistant eyewear or other similar implementations, without the exterior concave portions 110, which deflect outward (e.g., away from the central concave portion 106), the snap-fit may be difficult to engage. In particular, with the larger thicknesses and the rigid frame, a user may have to apply a significant pressure to interlock the female snap-fit feature 102 with a corresponding snap-fit feature defined in the frame. Accordingly, deflection of the hook-shaped protrusions 108 may be enable assembly and/or disassembly of eyewear implementing the first lens 100.

With reference to FIG. 1A, particular dimensions of an example embodiment are provided. For example, the first lens 100 may include a lens height 101, which may be between about 49.5 mm and about 50.5 mm. The first lens 100 may include a nose recess widths 103 and 105, which may be between about 19.7 mm and about 20.3 mm and 20.7 mm and 21.3 mm, respectively. The hook-shaped protrusions 108 may include a protrusion width 107. The protrusion width 107 may be defined at a central height of the hook-shaped protrusions 108. The protrusion width 107 may be between about 1.5 mm and about 1.9 mm. The two exterior concave portions 110 may include concave protrusion widths that may be between about 2.6 mm and about 3.0 mm. The central concave portion 106 may include a top width 111 and a central width 113. The top width 111 may be between about 7.15 mm and about 7.45 mm. The central width 113 may be between about 6.05 mm and about 6.35 mm. The first lens 100 may define a nose bridge portion 115. A distance 117 between the central concave portion 106 and a top 119 of the nose recess may be between about 15.2 mm and about 15.8 mm. The above-listed dimensions are relative to the depicted embodiment. With reference to FIG. 1B, a lens length 123 may be defined as a lateral distance between lens ends 121A and 121B. The lens length 123 may be about 143.5 mm and about 144.3 mm. With reference to FIG. 1C, a lens thickness 125 may be defined between an outer surface 127 and an inner surface 129 of the first lens 100. The lens thickness 125 may be between about 2.45 mm and about 2.55 mm. The first lens 100 may include a radius of curvature 131. The radius of curvature 131 may be between about 77.4 mm and about 78.5 mm. It may be appreciated with the benefit of the present disclosure that other embodiments may include one or more differing dimensions depending on intended use, style, size of intended user, application of the lens, and the like.

Figure 2A:
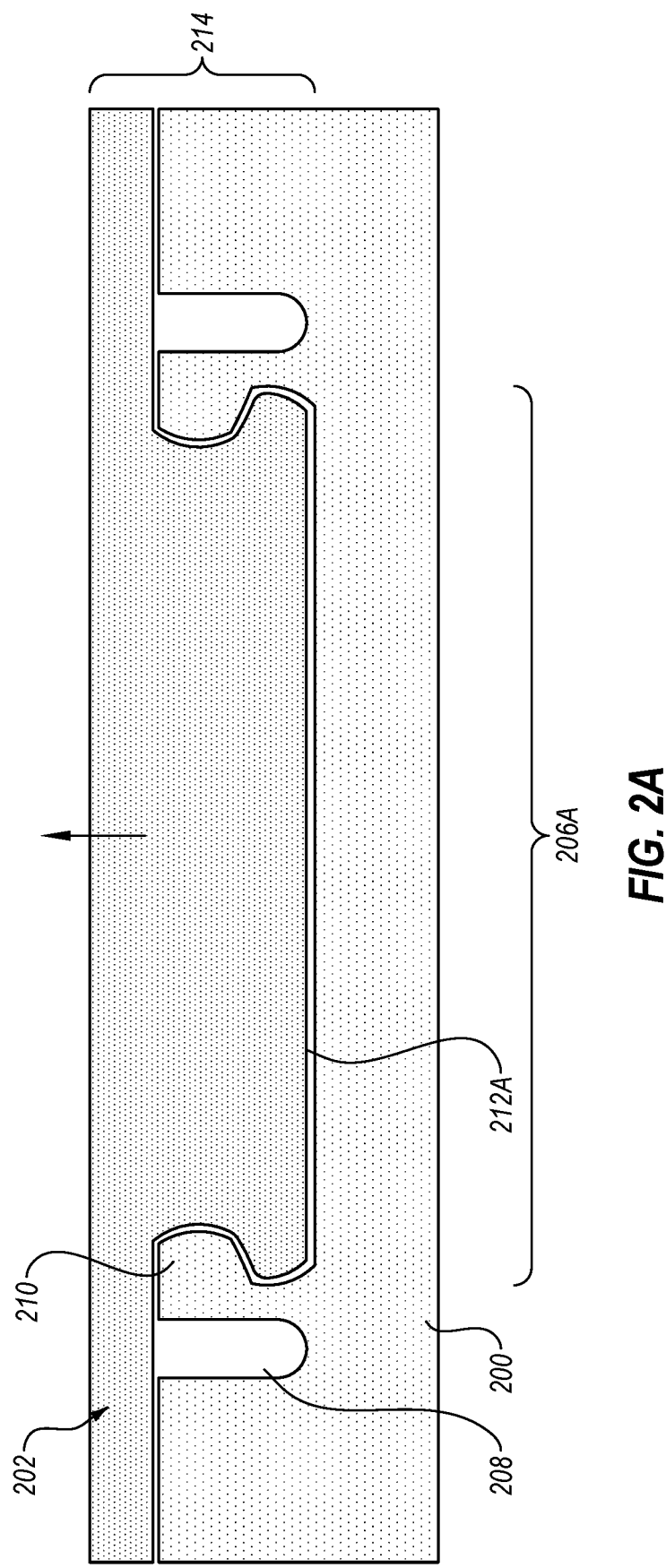
FIGS. 2A and 2B depict block diagrams of the female snap-fit feature of FIG. 1A engaged with an example male snap-fit feature.
Figure 2B:
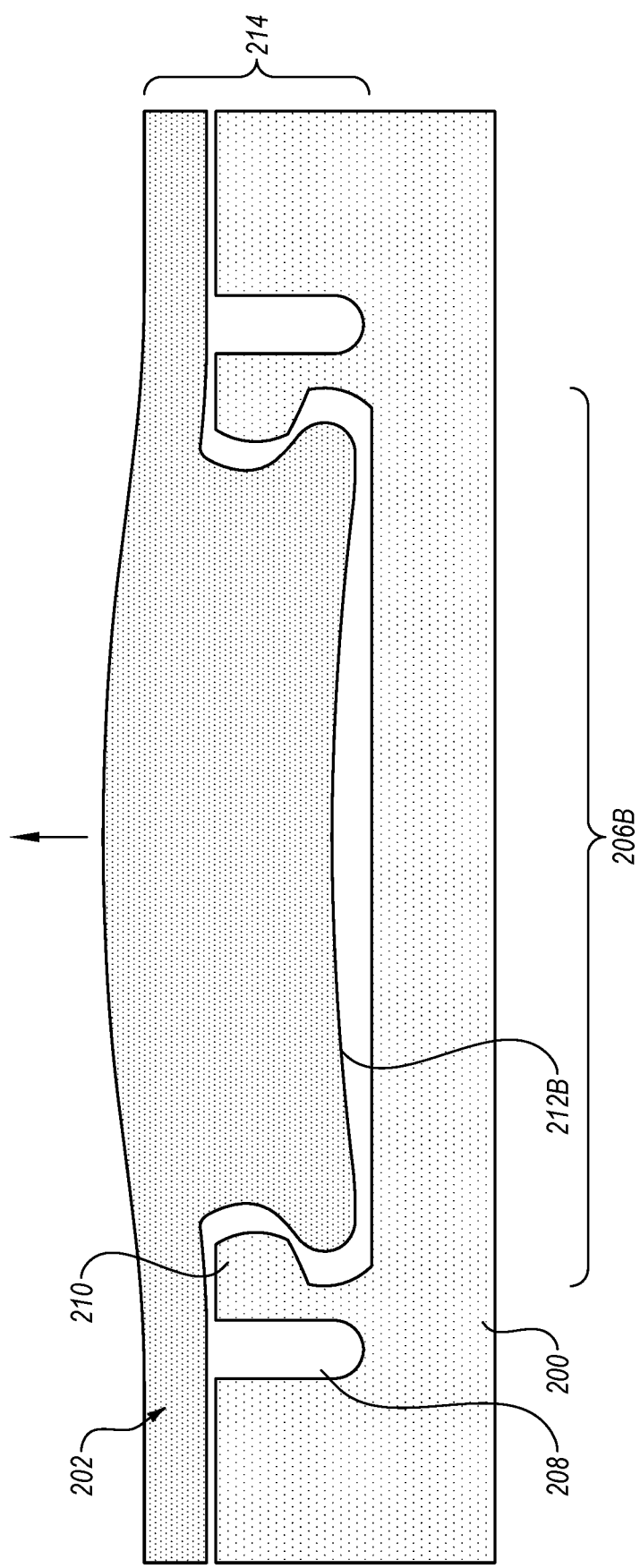

FIGS. 2A and 2B depict block diagrams of an example female snap-fit feature 200 engaged with an example male snap-fit feature 202. The female snap-fit feature 200 may be substantially equivalent to and/or correspond to the female snap-fit feature 102 of FIGS. 1A-1C. FIG. 2A depicts a properly sized central concave cavity 212A. FIG. 2B depicts an improperly sized central concave cavity 212B.

Referring to FIGS. 2A and 2B, the female snap-fit feature 200 includes exterior concave portions 208 and two hook-shaped protrusions 210. A distance 206A in FIG. 2A and 206B in FIG. 2B is defined between the two hook-shaped protrusions 210 across the central concave cavity 212A or 212B, respectively.

The distance 206A/206B between the hook-shaped protrusions 210 may be important in some embodiments. With greater distance or aspect ratio (distance 206A/206B-to-height 214), there is the potential for greater bending of the male snap-fit feature 202 away from the central concave cavity 212A. This increased potential for bending in the distance 206A/206B between the hook-shaped protrusions 210 increases the probability of lens/frame snap-fit dislodgement.

Referring back to FIGS. 1B and 1C, an example coordinate system may be defined by which the snap-fit temple interfaces (e.g., 400, 500, 600, 700, and 800) are described. In FIG. 1B, a top view of the first lens 100A is shown. In the top view of FIG. 1A, an arrow 151 is shown. The arrow 151 is positioned substantially normal to the outer surface 127. The arrow 151 may be positioned at any point on the outer surface 127, retaining its orientation as substantially normal to the outer surface 127. As used in the present disclosure, the direction of the arrow 151 is referred to as the direction normal to the outer surface 127.

With reference to FIG. 1C, two arrows 153 and 155 are depicted. The arrows 153 and 155 are two generally perpendicular directions (e.g., an x-direction and a y-direction or the like) along a lateral edge at the end 121A. These two generally perpendicular directions may be substantially perpendicular to the direction normal to the outer surface 127 (e.g., arrow 151). The direction 153 may be normal to the lateral edge of the lens 100. The lens/frame engagement geometries described herein may be oriented along these generally perpendicular directions to create a multidirectional interlock and provides a more secure engagement. This secure engagement is particularly important in preventing or reducing lens/frame dislodgment for applications in which the eyewear may be subjected to impact or other rough use. Additionally, movement of the lens 100 and other lenses described below may be described relative to these directions 151, 153, and 155.

FIGS. 3A-3C illustrate an example engagement process that may be implemented between snap-fit temple interfaces and temple assemblies described elsewhere in the present disclosure. FIG. 3A depicts a second lens 300 in a first position 301A relative to a portion of the temple assembly (hereinafter, "assembly portion") 302. FIG. 3B depicts the second lens 300 in a second position 301B relative to the assembly portion 302. FIG. 3C depicts the second lens 300 in a third position 301C relative to the assembly portion 302. Each of these positions 301A-301C is described below. In FIGS. 3A-3C, the assembly portion 302 is depicted transparently such that internal structures are visible.

Referring to FIG. 3A, the second lens 300 may include a snap-fit temple interface 304. The snap-fit temple interface 304 may be defined in a top edge 306 and a side edge 308 of the second lens 300. The assembly portion 302 may include a corresponding snap-fit interface 310 that is configured to be engaged with the snap-fit temple interface 304 of the second lens 300 through movement of the second lens 300 in two directions relative to the assembly portion 302.

In particular, in the depicted embodiment, the lens 300 may include a female-type snap-fit interface with a channel 317 defined in the top edge 306 and another female snap-fit feature 319, which is similar to the female snap-fit feature 102 of FIGS. 1A-1C, defined in the side edge 308. Corresponding snap-fit features in the assembly portion 302 may include a cylindrical or oval geometry 313 that is sized to fit in the channel and a male-style protrusion 315 that may be sized to be received by the female snap-fit feature 319. The assembly portion 302 may further define a cavity 321, which may be sized to receive a corner portion 323 of the second lens 300.

In the first position 301A, assembly portion 302 is separate from the second lens 300. The assembly portion 302 and the lens 300 may be in the first position 301A prior to assembly of eyewear, or when a user is interchanging lenses. In the first position 301A, the second lens 300 is separated from the assembly portion 302. For instance, the corner portion 323 is not received in the cavity 321 and the second lens 300 is separated physically from the assembly portion 302. Furthermore, the entire snap-fit temple interface 304 of the second lens 300 may be disengaged from the corresponding snap-fit interface 310 of the assembly portion 302.

With reference to FIGS. 3A and 3B, to transition between the first position 301A and the second position 301B, the second lens 300 may be moved in a first direction relative to the assembly portion 302. In the depicted embodiment, the first direction may be a movement in a y-direction of FIGS. 3A and 3B, which may correspond to direction 155 of the second lens 300 (described with reference to FIG. 1C). In the second position 301B, the cylindrical or oval geometry 313 may be positioned in the channel of the female-type snap-fit interface with a channel 317. In addition, the corner portion 323 may be at least partially positioned in the cavity 321. In the second position 301B, the female snap-fit feature 319 may not be engaged with the male-style protrusion 315. However, the female snap-fit feature 319 may be aligned with the male-style protrusion 315.

With reference to FIGS. 3B and 3C, to transition from the second position 301B to the third position 301C, the second lens 300 may be moved in a second direction relative to the assembly portion 302. For example, the second lens 300 may be moved in the direction 153 defined with reference to FIG. 1C. Movement in the second direction may engage the female snap-fit feature 319 with the male-style protrusion 315. The movement in the second direction may also engage the cylindrical or oval geometry 313 in the female-type snap-fit interface with a channel 317. Further, the movement in the second direction may press the corner portion 323 of the second lens 300 into the cavity 321. Accordingly, the engagement between the second lens 300 and the assembly portion 302 may involve two movements in directions that are substantially perpendicular to one another.

An impact to an outer surface 331 (e.g., a projectile impacting the outer surface 331) may deform the second lens 300. In some circumstances, deformation of the second lens 300 may be act to disengage the second lens 300 from the assembly portion 302. However, the deformation may only act to disengage the second lens 300 in one direction (e.g., 155, 153, or 151 of FIGS. 1B and 1C). Accordingly, the impact to the outer surface 331 may not dislodge the second lens 300 from the assembly portion 302. Instead, the impact to the outer surface 331 may act to transition from the third position 301C to the second position 301B. In the second position 301B, the second lens 300 may be partially retained relative to the assembly portion 302. Additionally or alternatively, in some circumstances, the deformation caused by the impact may act to disengage or potentially disengage in a direction that is substantially oblique (e.g., at some angle) to one or more of the primary directions of the snap-fit movements. For instance, not in any of the directions 151, 153, or 155, but at some angle between these directions. Again, in these circumstances, the impact to the outer surface 331 may not dislodge the second lens 300 from the assembly portion 302 because of the engagement in the two, substantially perpendicular directions.

Multiple other snap-fit interfaces are described below with reference to FIGS. 4A-8. Similar to the process of FIGS. 3A-3C, in each of these snap-fit interfaces, to engage a lens with the assembly portion, the lens is moved in two directions, which are substantially perpendicular to one another. Moreover, each of these snap-fit interfaces result in a similar improvement in retaining the lens at least partially retained relative to the assembly portion responsive to an impact on the outer surface 331.

In the embodiment of FIGS. 3A-3C, the first movement in the first direction is in the direction 155 described above and the second movement is in the direction 153. In other embodiments, the first direction may be the direction substantially normal to an outer surface 331 of the second lens 300, which is described above as normal to the outer surface 331. In these and other embodiments, the second direction may be in the direction 155 or 153.

Additionally, in the embodiments of FIGS. 3A-3C as well as those described below, the snap-fit temple interfaces are described relative to interlocking with a temple assembly. It may be appreciated with the benefit of the present disclosure, that the snap-fit interfaces may be implemented at a portion of a lens that surrounds a nose piece. For instance, in eyewear in which two lenses are implement and snap-fit at the temple assembly and at the nose piece, one or more embodiments may be implemented at the interface between the lens and the nose piece.

Figure 4A:
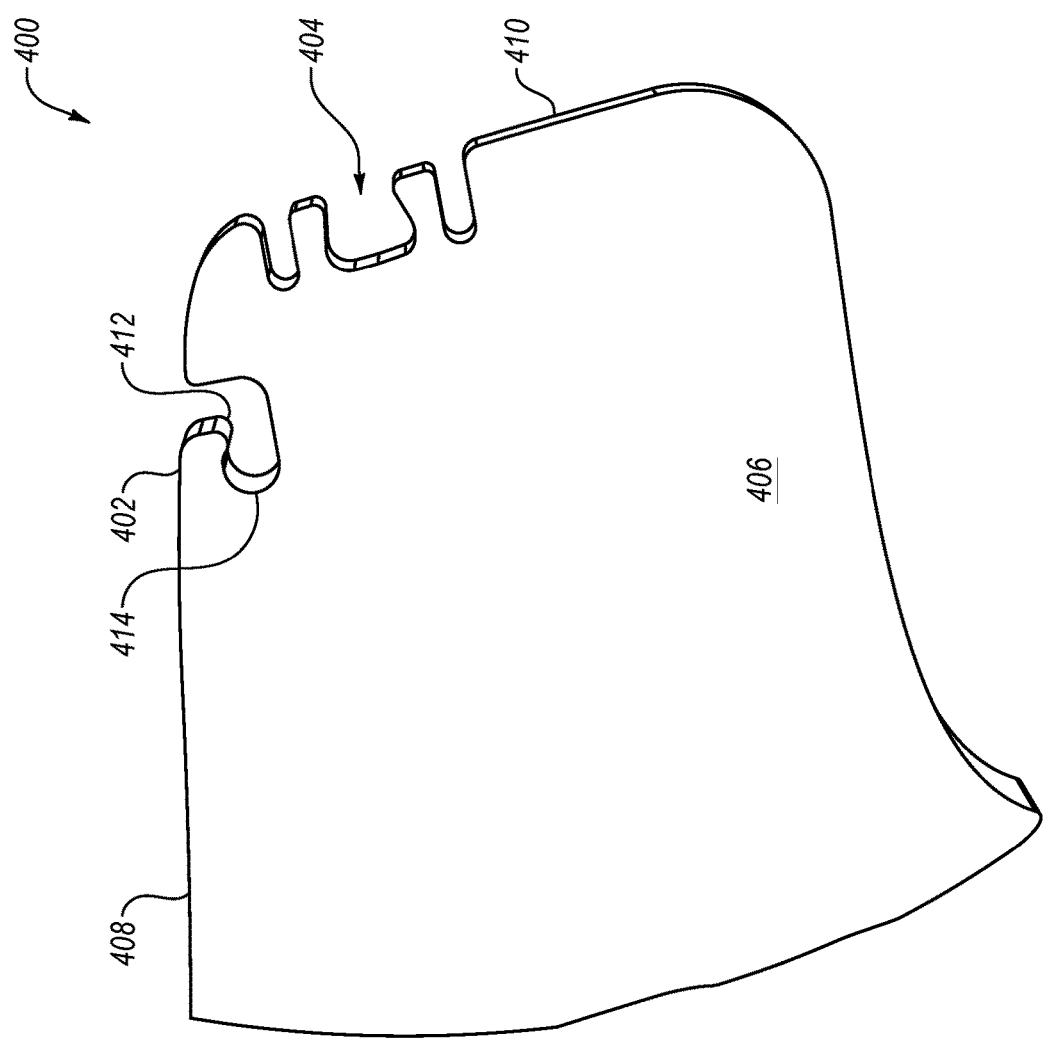
FIGS. 4A and 4B illustrate an example snap-fit temple interface that may be engaged according to the process of FIGS. 3A-3C.

FIG. 4A illustrates an example first snap-fit temple interface 400. The first snap-fit temple interface 400 may include a first snap-fit feature 402 and a second snap-fit feature 404. The first snap-fit feature 402 may be defined in a top edge 408 of a lens 406. The second snap-fit feature 404 may be defined along a lateral edge 410 of the lens 406. The first snap-fit feature 402 and the second snap-fit feature 404 may include female snap-fit geometries. The second snap-fit feature 404 may be substantially similar to the female snap-fit feature 102 described elsewhere in the present disclosure.

The first snap-fit feature 402 and the second snap-fit feature 404 may be engaged by movements performed sequentially. For example, in some embodiments the first snap-fit feature 402 may be engaged with or positioned in a first snap-fit feature of a brow piece and/or a temple assembly. Subsequently, the second snap-fit feature 404 may be engaged with a second snap-fit feature of a brow piece and/or a temple assembly. Engagement with the first snap-fit feature of a brow piece and/or a temple assembly may be achieved by moving the lens 406 in the y-direction of FIG. 4A relative to the brow piece and/or the temple assembly. The y-direction in FIG. 4A may correspond to the direction 155 of FIG. 1C. Subsequently, the lens 406 may be moved in the z-direction of FIG. 4A relative to the brow piece and/or the temple assembly. The z-direction in FIG. 4A may correspond to the direction 153 of FIG. 1C.

The first snap-fit feature 402 may include a ridge 412. The ridge 412 may protrude in a negative y-direction into a channel 414. The ridge 412 may maintain engagement of a male feature in the channel 414 of the first snap-fit feature 402. The channel 414 may allow forward (e.g., negative z-direction) movement of the frame's male portion to facilitate engagement in the second snap-fit feature 404. The channel 414 may also provide an additional secondary snap-fit in a direction generally consistent with the second snap-fit feature 404. Because the attachment of the lens 406 to the brow piece and/or the temple assembly requires two sequential movements in two different, substantially perpendicular directions, the probability of dislodgment by a force or forces in those same directions in corresponding order is greatly reduced.

In the depicted embodiment, the first snap-fit feature 402 is defined in the top edge 408 and the second snap-fit feature 404 is defined along the lateral edge 410. In other embodiments, the first snap-fit feature 402 may be defined in a lateral edge 410 and the second snap-fit feature 404 may be defined along the top edge 408. In these and other embodiments, the sequence of movements may be reversed. Alternatively, in some embodiments, the lens 406 may include two of the first snap-fit feature 402 or two of the second snap-fit feature 404. Additionally, only one side of the lens 406 is depicted. It may be understood with the benefit of this disclosure, that the other side of the lens 406 may include the first snap-fit feature 402 and the second snap-fit feature 404. Moreover, an embodiment that includes the first snap-fit temple interface 400 may also include the female snap-fit feature 102 defined on the top edge 408 in a central portion of the lens 406.

Figure 4B:
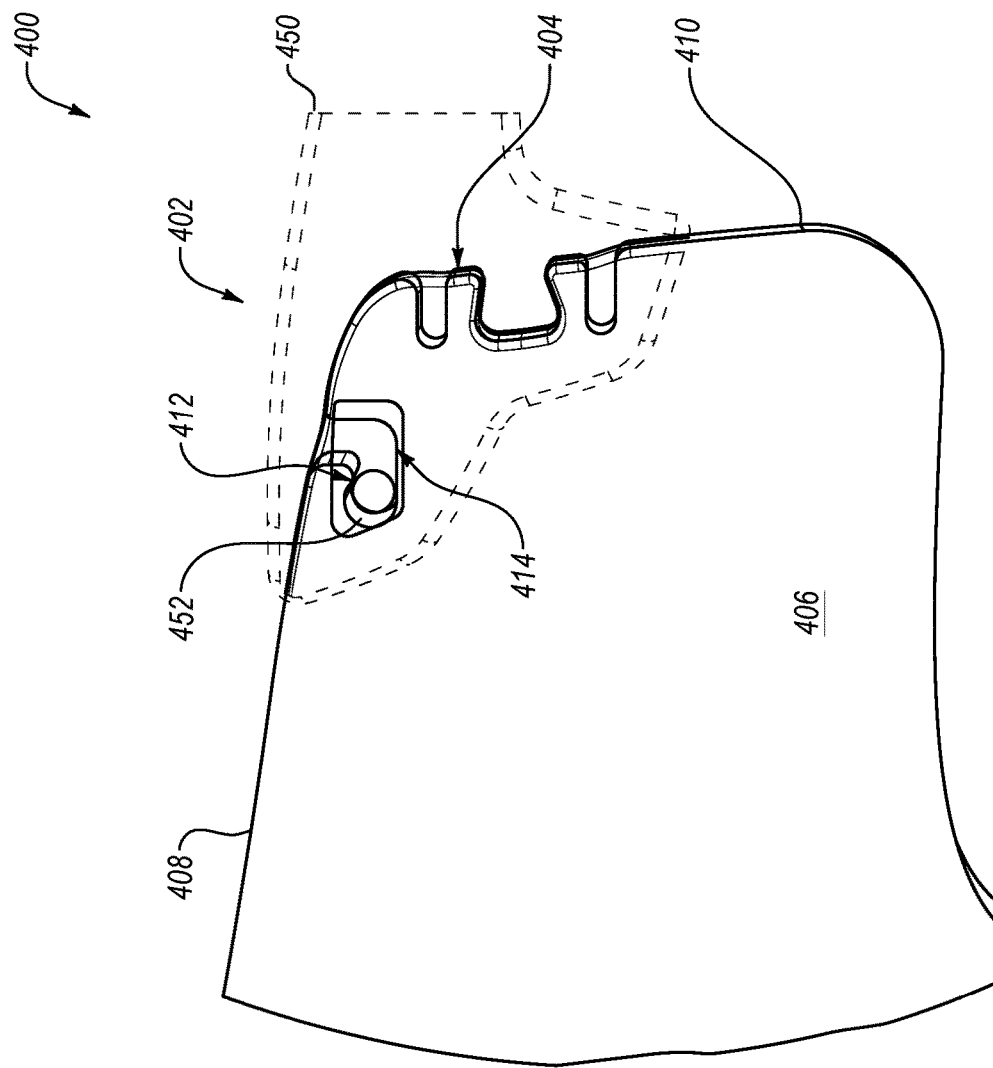

FIG. 4B depicts the lens 406 with a portion of a temple assembly 450. The temple assembly 450 is transparent in FIG. 4B. The temple assembly 450 may include a first male snap-fit feature 452 engaged in the channel 414 behind the ridge 412. Additionally, the temple assembly 450 may include a second male snap-fit feature 454 engaged in the second snap-fit feature 404. The first male snap-fit feature 452 may include a substantially oval cross-section as depicted in FIG. 4B. In some embodiments, the first male snap-fit feature 452 may include another cross-section such as a circular cross section or irregular shaped cross section.

Figure 5:
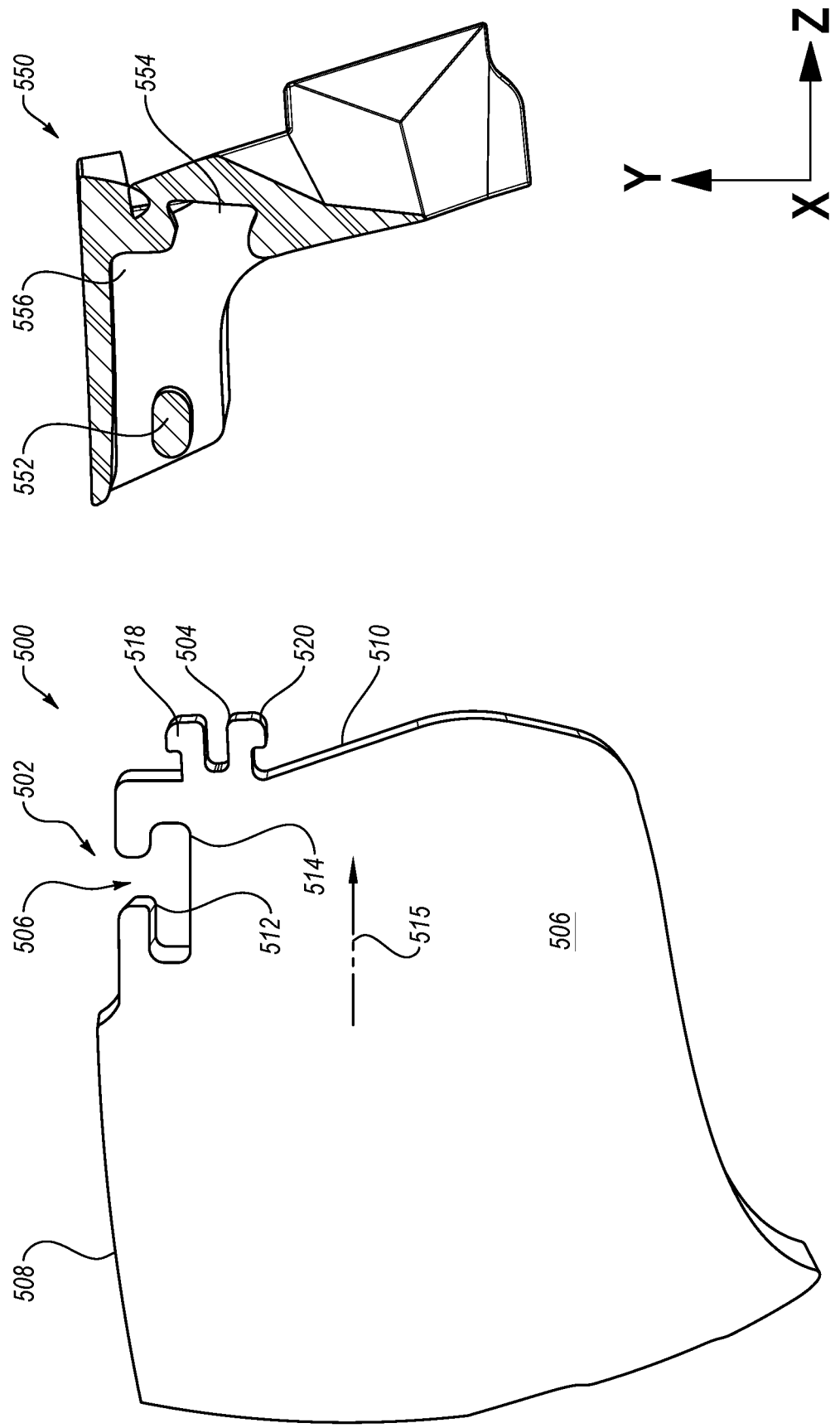
FIG. 5 illustrates another example snap-fit temple interface that may be engaged according to the process of FIGS. 3A-3C.

FIG. 5 illustrates an example second snap-fit temple interface 500. The second snap-fit temple interface 500 may include a third snap-fit feature 502 and a fourth snap-fit feature 504. The third snap-fit feature 502 may be defined in a top edge 508 of the lens 506. The fourth snap-fit feature 504 may be defined along a lateral edge 510 of the lens 506. The third snap-fit feature 502 includes a female snap-fit geometry and the fourth snap-fit feature 504 may include a male snap-fit geometry.

The third snap-fit feature 502 may be similar to the first snap-fit feature 402 described elsewhere in the present disclosure. However, the third snap-fit feature 502 may include an extended channel 514. The extended channel 514 may extend towards the lateral edge 510, and away from the lateral edge 510 from an entry channel 505 through which a male feature may enter the extended channel 514. The extended channel 514 may allow a rearward (e.g., the z-direction) motion and a forward (e.g., the negative z-direction) motion. For instance, the extended channel 514 may enable movement of the lens 506 in the direction represented by arrow 515.

The third snap-fit feature 502 may include a ridge 512 that protrudes in a negative y-direction into the extended channel 514. The ridge 512 may maintain engagement of a male feature in the extended channel 514 of the third snap-fit feature 502. The extended channel 514 may also provide an additional secondary snap-fit in a direction generally consistent with the fourth snap-fit feature 504.

The extended channel 514 of the third snap-fit feature 502 further reduces the probability of dislodgement of the lens 506. For instance, contrasting the extended channel 514 with the channel 414, the extended channel 514 may be less likely to result in disengagement of the lens 506 from an impact on the lens 506. With reference to FIGS. 4A and 4B, an impact on the lens 406 may result in the first male snap-fit feature 452 moving in the z-direction then in the y-direction, which may disengage the first male snap-fit feature 452 from the lens 406. In contrast, with reference to FIG. 5, the impact to the lens 506 may result in the first male snap-fit feature 452 moving in the z-direction. The extended channel 514, however, does not move first male snap-fit feature 452 in the y-direction. Instead, the extended channel 514 maintains the motion in the z-direction and negative z-direction, which may reduce the likelihood of the lens 506 becoming disengaged from the brow piece and/or temple assembly.

The fourth snap-fit feature 504 may include a male snap-fit feature. The fourth snap-fit feature 504 may include two finger-shaped protrusions 518 and 520. The finger-shaped protrusions 518 and 520 engage with the female snap-fit portion within the frame. The finger-shaped protrusions 518 and 520 deflect towards one another to facilitate the snap-fit.

The third snap-fit feature 502 and the fourth snap-fit feature 504 may be engaged through sequential movements. For example, in some embodiments, a first movement of the lens 506 may position a corresponding third snap-fit feature (e.g., 452 of FIG. 4B) of a brow piece and/or a temple assembly in the third snap-fit feature 502. The first movement may be in a y-direction of FIG. 5, which may correspond to the direction 155 of FIG. 1C. Subsequently, the lens 506 may be moved such that the fourth snap-fit feature 504 may be engaged with a fourth snap-fit feature of the brow piece and/or the temple assembly and the corresponding third snap-fit feature may be engaged in the third snap-fit feature 502. For instance, the corresponding third snap-fit feature may be positioned such that the ridge 512 retains it. The subsequent movement may be in the z-direction of FIG. 5, which may correspond to the direction 153 of FIG. 1C. Because the attachment of the lens 506 to the brow piece and/or the temple assembly requires two sequential movements in two different, substantially perpendicular directions, the probability of dislodgment by a force or forces in those same directions in corresponding order is greatly reduced.

In the depicted embodiment, the third snap-fit feature 502 is defined in the top edge 508 and the fourth snap-fit feature 504 is defined along the lateral edge 510. In other embodiments, the third snap-fit feature 502 may be defined in the lateral edge 510 and the fourth snap-fit feature 504 may be defined along the top edge 508. In these and other embodiments, the sequence of movements may be reversed. Alternatively, in some embodiments, the lens 506 may include two of the third snap-fit feature 502 or two of the fourth snap-fit feature 504. Additionally, only one side of the lens 506 is depicted. It may be understood with the benefit of this disclosure, that the other side of the lens 506 may include the third snap-fit feature 502 and the fourth snap-fit feature 504. Moreover, an embodiment that includes the second snap-fit temple interface 500 may also include the female snap-fit feature 102 defined on the top edge 508 in a central portion of the lens 506.

FIG. 5 depicts the lens 506 with a portion of a temple assembly 550 that is configured to interface with the second snap-fit temple interface 500. A sectional view of the temple assembly 550 is depicted in FIG. 5. The temple assembly 550 may include a second male snap-fit feature 552 that is configured to be engaged in the channel 514 and behind the ridge 512. The second male snap-fit feature 552 may include an elongated cylindrical cross-section as depicted in FIG. 5. In some embodiments, the second male snap-fit feature 552 may include another cross-section such as a circular cross section, an oval cross section, or irregular shaped cross section. Introduction of the second male snap-fit feature 552 in the channel 514 may be performed as described with reference to FIGS. 3A-3C.

Additionally, the temple assembly 550 may include another female snap-fit feature 554. The female snap-fit feature 554 may be configured to receive and engage the fourth snap-fit feature 504. For instance, heights of the female snap-fit feature 554 may be configured to press the protrusions 518 and 520 together, then enable expansion of the protrusions 518 and 520 into the female snap-fit feature 554. The temple assembly 550 may define a cavity 556. The cavity 556 may be configured receive a corner portion of the lens 506 that includes the snap-fit temple interface 500.

FIG. 6A illustrates an example third snap-fit temple interface 600. The third snap-fit temple interface 600 may include a fifth snap-fit feature 602 and a sixth snap-fit feature 604. The fifth snap-fit feature 602 may be defined in a top edge 608 of a lens 606. The fifth snap-fit feature 602 includes a female snap-fit geometry that is similar to the female snap-fit feature 102 of FIGS. 1A-1C.

The sixth snap-fit feature 604 may be defined in a material of the lens 606. The sixth snap-fit feature 604 may be defined near a lateral edge 610 of the lens 606. The sixth snap-fit feature 604 may include a FIG. 8 geometry. The sixth snap-fit feature 604 may include two cylindrical portions that are generally oriented in the y-direction of FIG. 6A. The sixth snap-fit feature 604 may enable a first engagement that is normal to an outer surface 607 of the lens 606. The direction normal to the outer surface 607 may correspond to the direction 151 of FIG. 1B.

The fifth snap-fit feature 602 and the sixth snap-fit feature 604 may be engaged through sequential movements of the lens 606. For example, in some embodiments, a first cylindrical portion 605 of the sixth snap-fit feature 604 may enable for the normal engagement with an engagement feature of a brow piece and/or a temple assembly. Subsequently, the fifth snap-fit feature 602 may be engaged with another corresponding snap-fit feature of the brow piece and/or the temple assembly. The movement that engages the fifth snap-fit feature 602 may also transition the engagement feature of the brow piece and/or the temple assembly to the second cylindrical portion 611 of the sixth snap-fit feature 604. The sixth snap-fit feature 604 may allow for forward movement (e.g., in a direction 151 of FIG. 1B or opposite thereof) of the fifth snap-fit feature 602. Because the attachment of the lens 606 to the brow piece and/or the temple assembly requires two sequential movements in two different, substantially perpendicular directions, the probability of dislodgment by a force or forces in those same directions in corresponding order is greatly reduced.

Additionally, only one side of the lens 606 is depicted. It may be understood with the benefit of this disclosure, that the other side of the lens 606 may include the fifth snap-fit feature 602 and the sixth snap-fit feature 604. Moreover, an embodiment that includes the third snap-fit temple interface 600 may also include the female snap-fit feature 102 defined on the top edge 608 in a central portion of the lens 606.

Figure 6C:
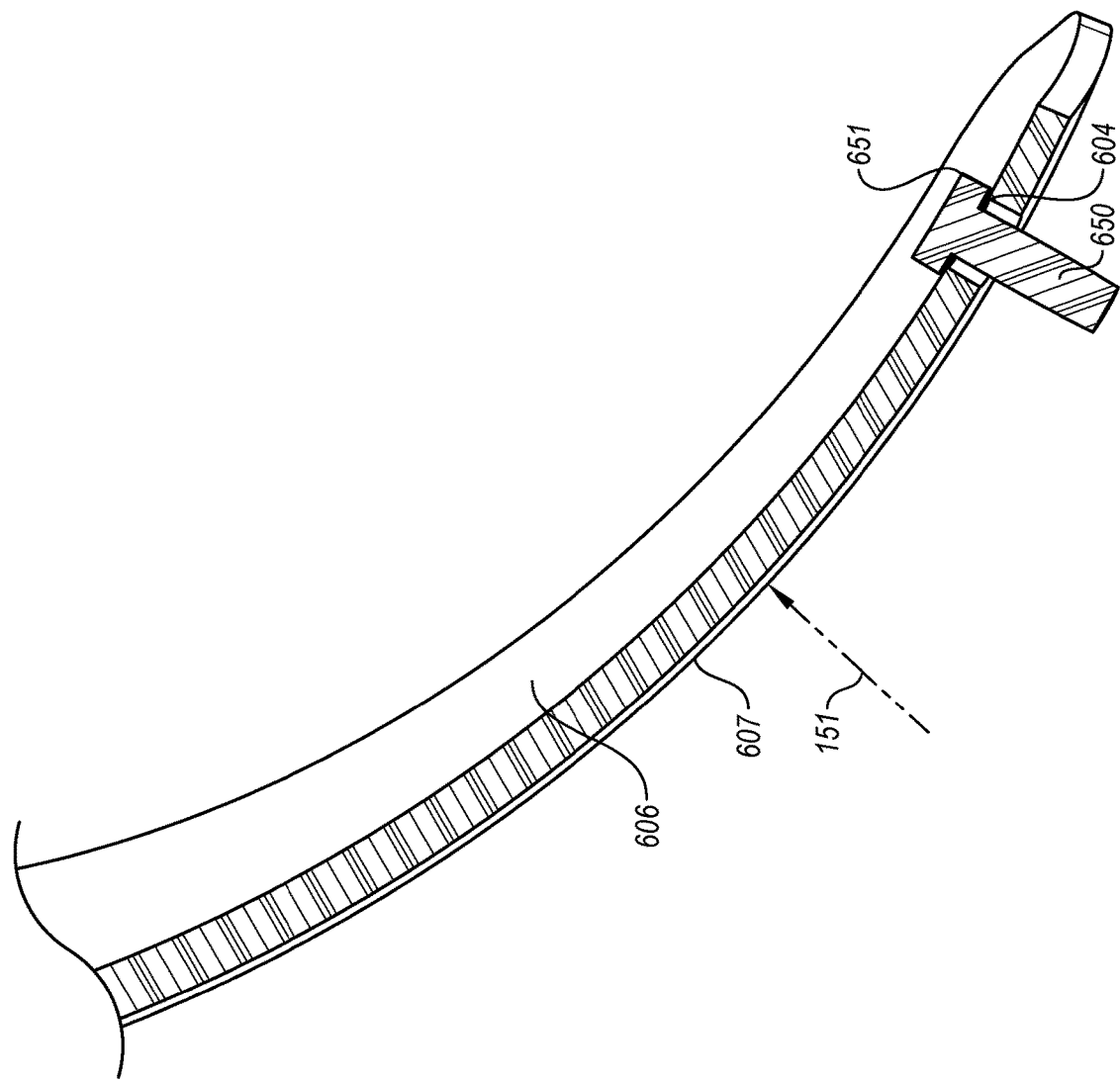

FIGS. 6B and 6C depict an example of the engagement feature 650 of the brow piece and/or the temple assembly positioned in and engaged with the sixth snap-fit feature 604. The engagement feature 650 may include a pin or generally cylindrical structure with a diameter that is similar or substantially similar to a diameter of the cylindrical portions 605 and 611 of the sixth snap-fit feature 604.

As discussed above, the sixth snap-fit feature 604 may enable motion (e.g., due to displacement caused by an impact on the outer surface 607) of the lens 606 that is normal to the outer surface 607. For example, the lens 606 may be moved in a direction normal to the outer surface 607 of the lens 606 relative to the engagement feature 650. When the engagement feature 650 is positioned at a particular distance relative to the lens 606, the engagement feature 650 snaps into the first cylindrical portion 605 of the FIGURE-8 geometry. Following the engagement feature 650 being snap-fit into the first cylindrical portion 605 of the FIGURE-8 geometry, the lens 606 may be moved in the negative y-direction of FIG. 6B relative to the engagement feature 650. The engagement feature 650 may then shift and snap-fit into the second cylindrical portion 611 of the FIGURE-8 geometry. Additionally, motion of the lens 606 may result in the fifth snap-fit feature 602 being engaged with a corresponding snap-fit feature defined in the brow piece and/or a temple assembly.

With reference to FIG. 6C, in some embodiments, the engagement feature 650 may include an end structure 651. The end structure 651 may restrict movement of the lens 606 in the direction normal to the outer surface 607 and facilitate the snap-fit engagement between the engagement feature 650 and the sixth snap-fit feature 604.

In the embodiment depicted in FIGS. 6A-6C, the fifth snap-fit feature 602 is defined in the top edge 608 and the sixth snap-fit feature 604 is defined near the lateral edge 610. In other embodiments, the fifth snap-fit feature 602 may be defined in the lateral edge 610 and the sixth snap-fit feature 604 may be defined near the top edge 608. In these and other embodiments, the sequence of movements may be reversed. Additionally or alternatively, the fourth snap-fit feature 604 may be rotated. For instance, in the embodiment of FIGS. 6A-6C, the cylindrical portions 605 and 611 are oriented substantially in the y-direction of FIGS. 6A-6C. In other embodiments, the cylindrical portions 605 and 611, may be oriented in the z-direction (e.g., the first cylindrical portion 605 being to the left or right of the second cylindrical portion 611). Alternatively, the cylindrical portions 605 and 611 may be oriented at some angle relative to one another (e.g., the first cylindrical portion 605 may include a greater y-coordinate and greater z-coordinate than the y-coordinate and the z-coordinate of the second cylindrical portion 611 or vice versa).

Additionally, only one side of the lens 606 is depicted in FIGS. 6A-6C. It may be understood with the benefit of this disclosure, that the other side of the lens 606 may include the fifth snap-fit feature 602 and the sixth snap-fit feature 604. Moreover, an embodiment that includes the third snap-fit temple interface 600 may also include the female snap-fit feature 102 defined on the top edge 608 in a central portion of the lens 606.

Figure 7B:
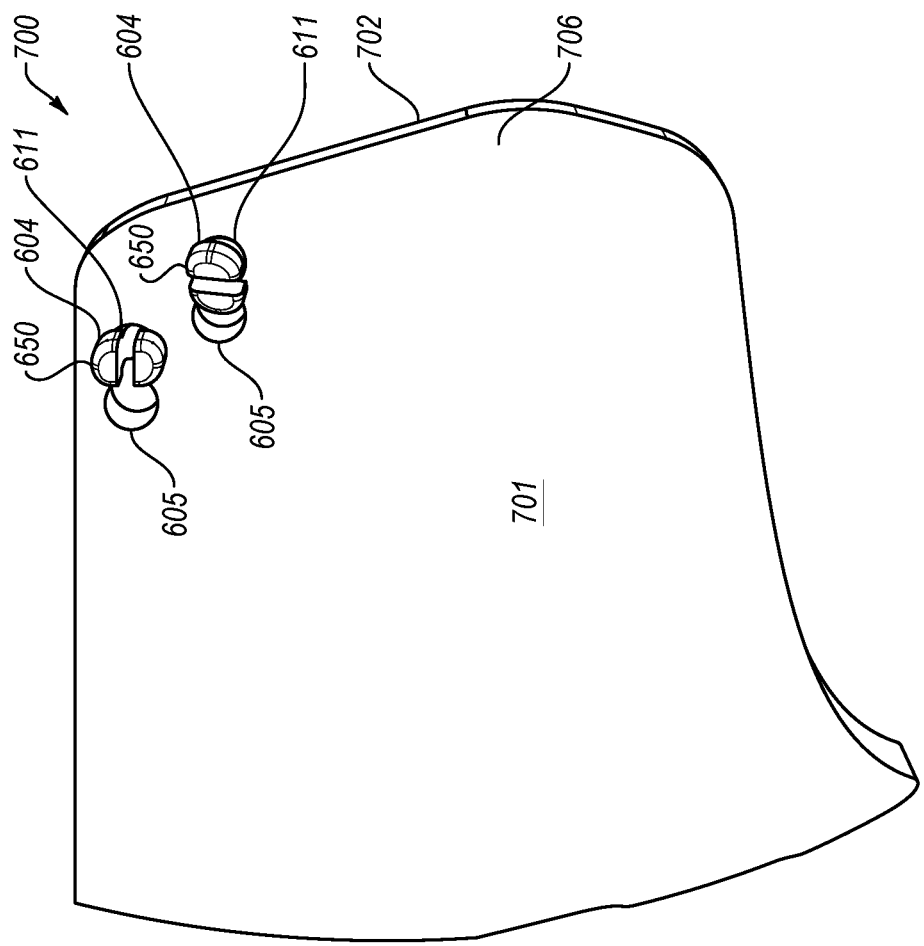

FIGS. 7A and 7B depict an example fourth snap-fit temple interface 700. The fourth snap-fit temple interface 700 may include two of the sixth snap-fit features 604 described with reference to FIGS. 6A-6C. As described above, the sixth snap-fit features 604 include a FIG. 8 geometry. The sixth snap-fit features 604 in the fourth snap-fit temple interface 700 are oriented in the z-direction of FIGS. 7A and 7B. For instance, the first cylindrical portions 605 of each of the sixth snap-fit features 604 may be defined to the left or the right of the second cylindrical portions 611.

In FIG. 7B, engagement features 650 of the brow piece and/or temple assembly are depicted retained in the sixth snap-fit features 604. Engagement between the sixth snap-fit features 604 and corresponding snap-fit feature (e.g., including the engagement feature 650) includes two sequential movements of a lens 706 relative to a temple assembly. The temple assembly configured to engage with the embodiment of FIGS. 7A and 7B may be similar to that depicted in FIG. 4B and/or FIGS. 3A-3C.

The two sequential movements may be two different, substantially perpendicular directions. The substantially perpendicular directions include a first direction that is towards or normal to the outer surface 701 of the lens 706. The substantially perpendicular directions include a second direction that is towards or normal to the lateral edge 702 of the lens 706. In some embodiments, the lens 706 may include the female snap-fit feature 102 of FIGS. 1A-1C. The female snap-fit feature 102 may be defined in a central portion of a top edge of the lens 706.

Figure 8:
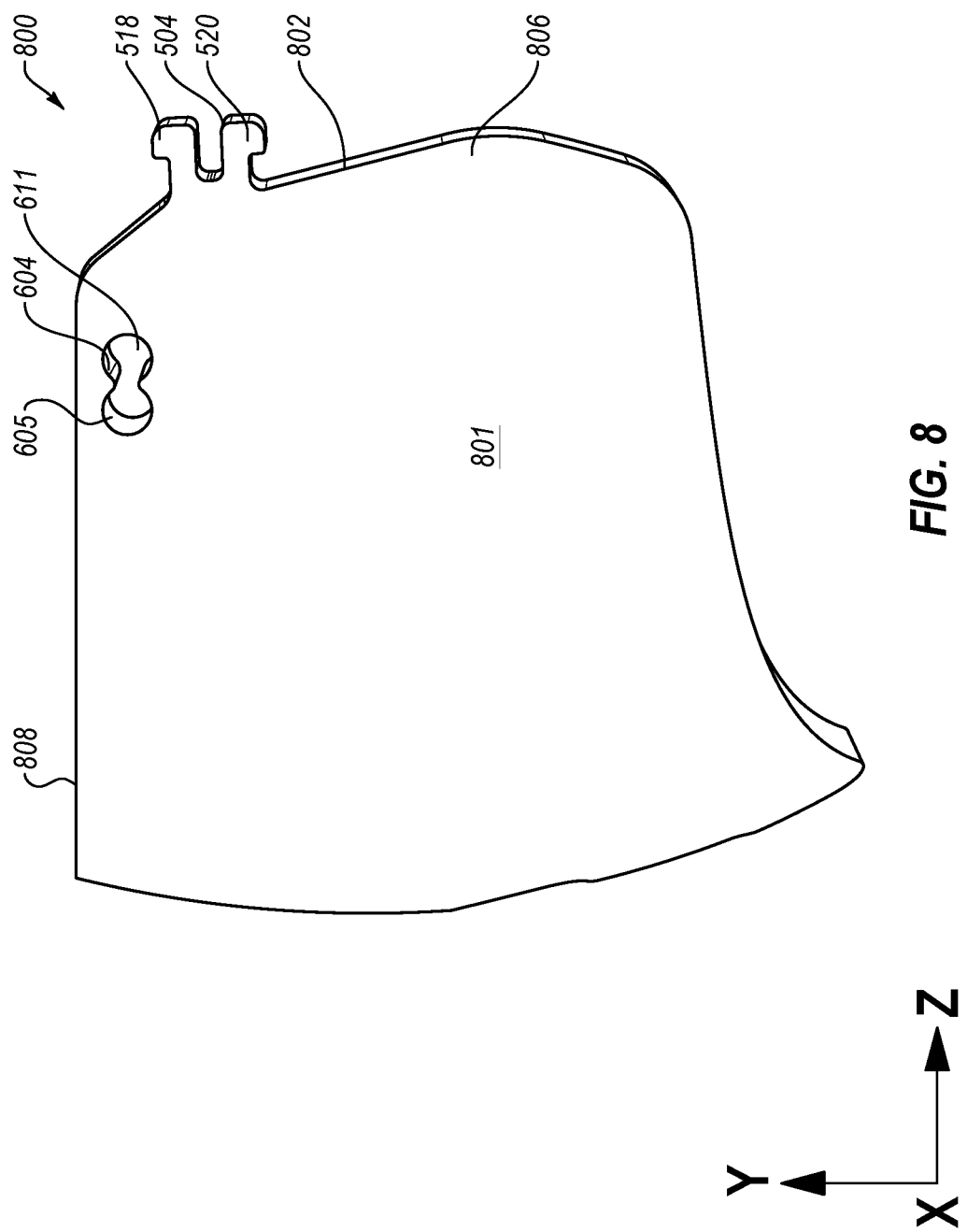
FIG. 8 depicts another example snap-fit temple interface that may be engaged according to the process of FIGS. 3A-3C.

FIG. 8 illustrates an example fifth snap-fit temple interface 800. The fifth snap-fit temple interface 800 may include the sixth snap-fit feature 604 described with reference to FIGS. 6A-6C and the fourth snap-fit feature 504 of FIG. 5. For example, the sixth snap-fit feature 604 may include the FIG. 8 geometry. The sixth snap-fit feature 604 may be defined in the material of a lens 806. The sixth snap-fit feature 604 may be defined near a top edge 808 of the lens 806. The sixth snap-fit feature 604 may be oriented in the z-direction. As described with reference to FIGS. 6B and 6C, the sixth snap-fit feature 604 may be configured to interface with the engagement feature 650. The engagement feature 650 may be configured to restrict movement of the lens 806 in the direction normal to an outer surface 801 and to facilitate the snap-fit engagement between the engagement feature 650 and the sixth snap-fit feature 604.

The fourth snap-fit feature 504 of FIG. 5 may include male snap-fit geometry that extends from a lateral edge 802 of the lens 806. The fourth snap-fit feature 504 includes the two finger-shaped protrusions 518 and 520. The finger-shaped protrusions 518 and 520 may be configured to deflect towards one another to facilitate a snap-fit engagement with a female snap-fit portion of a temple assembly.

Engagement between the fourth snap-fit feature 504 and a first corresponding snap-fit feature and between the sixth snap-fit feature 604 and the second corresponding snap-fit feature (e.g., including the engagement feature 650) includes two sequential movements of the lens 806 relative to a temple assembly. The temple assembly configured to engage with the embodiment of FIG. 8 may be similar to that depicted in FIG. 4B and/or FIGS. 3A-3C. The two sequential movements may be two different, substantially perpendicular directions. The substantially perpendicular directions include a first direction that is towards or normal to the outer surface 801 of the lens 806. The substantially perpendicular directions include a second direction that is towards or normal to the lateral edge 802 of the lens 806. In some embodiments, the lens 806 may include the female snap-fit feature 102 of FIGS. 1A-1C. The female snap-fit feature 102 may be defined in a central portion of a top edge of the lens 806.

Figure 9:
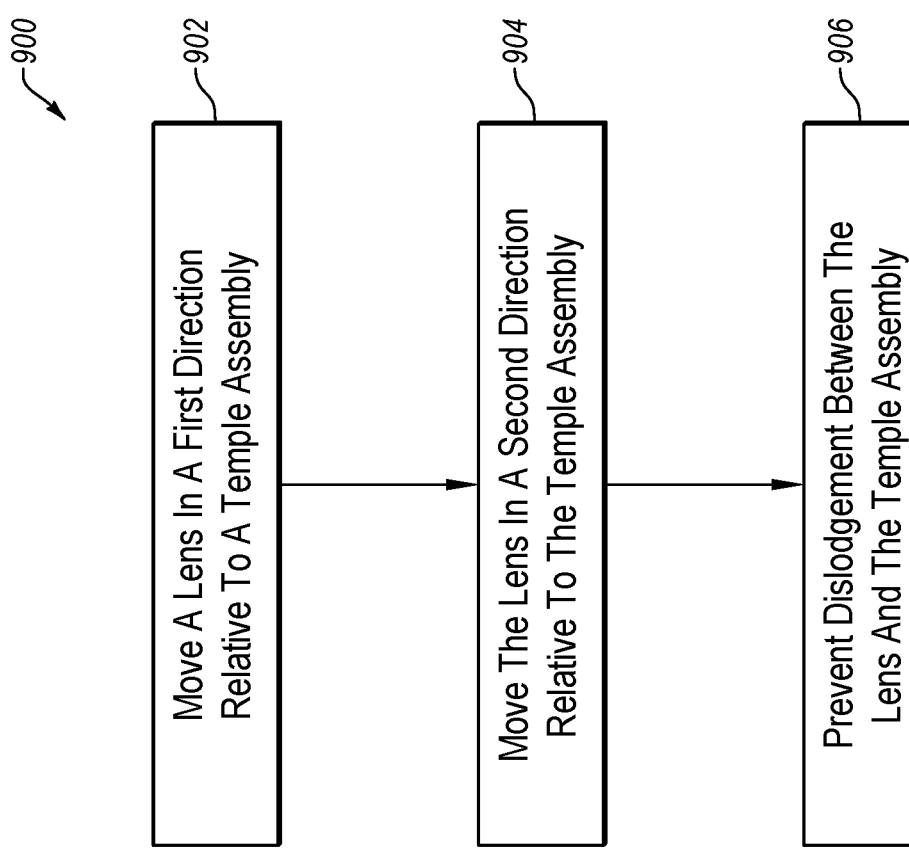
FIG. 9 is a flow chart of an example method of engagement between a lens and a temple assembly, all in accordance with at least one embodiment described in the present disclosure.

FIG. 9 is a flow chart of an example method 900 of engagement between a lens and a temple assembly. The method 900 may be implemented during use of lenses such as the lenses 100, 300, 406, 506, 606, 706, and 806 described elsewhere in the present disclosure. Although illustrated as discrete blocks, one or more blocks in FIG. 9 may be divided into additional blocks, combined into fewer blocks, or eliminated, depending on the desired implementation.

The method 900 may begin at block 902 in which a lens may be moved in a first direction relative to a temple assembly. The lens may be moved in the first direction such that a first corresponding snap-fit feature of the temple assembly may be positioned in a first snap-fit feature of the lens. At block 904, the lens may be moved in a second direction relative to the temple assembly. The lens may be moved in the second direction sequentially, following the first movement. The lens may be moved in the second direction such that the first snap-fit feature is engaged with the first corresponding snap-fit feature and a second snap-fit feature of the lens is engaged with a second corresponding snap-fit feature of the temple assembly. The first direction may be substantially perpendicular to the second direction.

At block 906, dislodgement between the lens and the temple assembly may be prevented. The dislodgement between the lens and the temple assembly may be prevented responsive to an impact to an outer surface of the lens. The dislodgement between the lens and the temple assembly may be prevented by enabling motion of the lens relative to the temple assembly in the first direction and preventing motion of the lens relative to the temple assembly in the second direction.

The lens may include a top edge and a lateral edge. In some embodiments, the first direction may be towards the top edge of the lens and the second direction may be normal to the lateral edge of the lens. Additionally, the first snap-fit feature may include a female snap-fit feature defined in the top edge of the lens, which may include an extended channel and a ridge. The extended channel may allow motion of the temple assembly in a third direction that is substantially opposite the second direction responsive to an impact on an outer surface of the lens. The ridge may protrude in the first direction into the extended channel and may be configured to maintain the first corresponding snap-fit feature in the extended channel. In these and other embodiments, the first corresponding snap-fit feature may include a first male snap-fit feature. The first snap-fit feature may be configured to be engaged in the extended channel. The second snap-fit feature includes male snap-fit geometry that extends from the lateral edge of the lens. The second snap-fit feature may include two finger-shaped protrusions configured to deflect towards one another to facilitate a snap-fit engagement with a female snap-fit portion of the temple assembly.

In other embodiments, the first direction may be towards the outer surface of the lens. The second direction may be normal to the lateral edge of the lens. The first snap-fit feature may include a FIG. 8 geometry defined in a material of the lens proximate the top edge of the lens. In these and other embodiments, the first corresponding snap-fit feature may include an engagement feature that includes an end structure that is configured to restrict movement of the lens in the direction normal to the outer surface and to facilitate the snap-fit engagement between the engagement feature and the first snap-fit feature. Additionally, the second snap-fit feature includes male snap-fit geometry that extends from the lateral edge of the lens.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of this disclosure. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

What is claimed is:

1. A snap-fit temple interface of a lens that is configured to be interlocked with a temple assembly, the snap-fit temple interface comprising:
   a first snap-fit feature of the lens, the first snap fit feature including a first flexible part and a second flexible part, the first snap-fit feature being configured to be engaged with a first complimentary snap-fit feature of the temple assembly through application of a first force in a first direction that is sufficient to temporarily displace the first flexible part followed by application of a second force in a second direction, wherein the first force is imposed by a first movement of the lens in the first direction relative to the temple assembly; and
   a second snap-fit feature of the lens, the second snap fit feature including a third flexible part, the second snap fit feature being configured to be engaged with a second complimentary snap-fit feature of the temple assembly through application of the second force in the second direction, the second force being sufficient to temporarily displace the second flexible part of the first snap-fit feature and the third flexible part, wherein the second force is imposed by a second movement following the first movement of the lens in the second direction relative to the temple assembly,
   wherein:
   the first direction is substantially perpendicular to the second direction, and
   engagement between the second snap-fit feature and the second complimentary snap-fit feature and between the first snap-fit feature and the first complimentary snap-fit feature interlocks the lens to the temple assembly in at least two different directions to prevent lens dislodgement from the temple assembly.

2. The snap-fit temple interface of claim 1, wherein:
the first snap-fit feature includes a female snap-fit feature defined in a top edge of the lens; and
the second snap-fit feature includes male snap-fit geometry that extends from a lateral edge of the lens.

3. The snap-fit temple interface of claim 2, wherein:
the first direction is a direction towards a top edge of the lens; and
the second direction is a direction normal to the lateral edge of the lens.

4. The snap-fit temple interface of claim 2, wherein the first snap-fit feature includes an extended channel that allows motion of the temple assembly in a third direction that is substantially opposite the second direction responsive to an impact on an outer surface of the lens.

5. The snap-fit temple interface of claim 4, wherein the first snap-fit feature includes a ridge that protrudes in the first direction into the extended channel and is configured to maintain the second complimentary snap-fit feature in the extended channel.

6. The snap-fit temple interface of claim 2, wherein the second snap-fit feature includes two finger-shaped protrusions configured to deflect towards one another to facilitate a snap-fit engagement with a female snap-fit portion of the temple assembly.

7. The snap-fit temple interface of claim 1, wherein:
the first snap-fit feature includes a FIGURE-8 geometry including two cylindrical portions oriented in a direction and defined in a material of the lens proximate a top edge of the lens; and
the second snap-fit feature includes male snap-fit geometry that extends from a lateral edge of the lens.

8. The snap-fit temple interface of claim 7, wherein:
the first direction is a direction normal to an outer surface of the lens; and
the second direction is a direction normal to the lateral edge of the lens.

9. The snap-fit temple interface of claim 1, wherein engagement between the first snap-fit feature and the first complimentary snap-fit feature and between the second snap-fit feature and the second complimentary snap-fit feature involving the first movement and the second movement is configured to maintain engagement between the lens and the temple assembly responsive to an impact on an outer surface of the lens.

10. Eyewear comprising:
a temple assembly that includes a first complimentary snap-fit feature and a second complimentary snap-fit feature; and
a lens that includes a first snap-fit feature and a second snap-fit feature, the first snap-fit feature corresponding to the first complimentary snap-fit feature, and the second snap-fit feature being positioned on a side of the lens and corresponding to the second complimentary snap-fit feature,
wherein:
the first snap-fit feature is configured to be engaged with the first complimentary snap-fit feature through a first movement of the lens in a first direction and a second movement of the lens in a second direction, the first movement imposing a first force that is sufficient for temporary displacement of a first flexible part of the first snap-fit feature or the first complimentary snap-fit feature;
the second snap-fit feature is configured to be engaged with the second complimentary snap-fit feature through the second movement of the lens in the second direction, the second movement applying a second force sufficient for temporary displacement of a second flexible part of the first snap-fit feature or the first complimentary snap-fit feature and temporary displacement of a third flexible part of the second snap-fit feature or the second complimentary snap-fit feature;
engagement between the first snap-fit feature and the first complimentary snap-fit feature and between the second snap-fit feature and the second complimentary snap-fit feature includes two sequential movements of the lens relative to the temple assembly in two different, substantially perpendicular directions; and
the engagements interlock the lens to the temple assembly in the two different directions to prevent lens dislodgement from the temple assembly responsive to an impact to an outer surface of the lens.

11. The eyewear of claim 10, wherein:
the lens includes a top edge and a lateral edge;
the substantially perpendicular directions include a first direction that is towards the top edge of the lens; and
the substantially perpendicular directions include a second direction that is normal to the lateral edge of the lens.

12. The eyewear of claim 11, wherein:
the first snap-fit feature includes a female snap-fit feature defined in the top edge of the lens;
the first snap-fit feature includes an extended channel that allows motion of the temple assembly in a third direction that is substantially opposite the second direction responsive to an impact on an outer surface of the lens and a ridge that protrudes in the first direction into the extended channel and is configured to maintain the second complimentary snap-fit feature in the extended channel;
the second snap-fit feature includes male snap-fit geometry that extends from the lateral edge of the lens;
the second snap-fit feature includes two finger-shaped protrusions configured to deflect towards one another to facilitate a snap-fit engagement with a female snap-fit portion of the temple assembly; and
the first complimentary snap-fit feature includes a first male snap-fit feature configured to be engaged in the extended channel.

13. The eyewear of claim 10, wherein:
the lens includes an outer surface and a lateral edge;
the substantially perpendicular directions include a first direction that is towards the outer surface of the lens; and
the substantially perpendicular directions include a second direction that is normal to the lateral edge of the lens.

14. The eyewear of claim 13, wherein:
the first snap-fit feature includes a FIGURE-8 geometry including two cylindrical portions oriented in a direction and defined in a material of the lens proximate a top edge of the lens;
the first complimentary snap-fit feature includes an engagement feature that includes an end structure that is configured to restrict movement of the lens in the direction normal to the outer surface and to facilitate the snap-fit engagement between the engagement feature and the first snap-fit feature; and
the second snap-fit feature includes male snap-fit geometry that extends from the lateral edge of the lens.

15. The eyewear of claim 10, wherein:
the lens includes a female snap-fit feature that is defined in a central portion of a top edge of the lens;
the female snap-fit feature includes two hook-shaped protrusions, two exterior concave portions, and a central concave portion;
the hook-shaped protrusions are positioned between the two exterior concave portions and the central concave portion;
the hook-shaped protrusions define the dimensions of the central concave portion; and
the two exterior concave portions are configured to allow deflection of the hook-shaped protrusions.

16. The eyewear of claim 15, wherein an aspect ratio of a distance between the hook-shaped protrusions to a height of the hook-shaped protrusions is configured to minimize bending of complimentary male snap-fit feature configured for engagement with the female snap-fit feature in a direction away from the central concave portion.

17. A method of multidirectional interlock between a lens and a temple assembly, the method comprising:
moving a lens in a first direction relative to a temple assembly, wherein the lens is moved in the first direction such that a first complimentary snap-fit feature of the temple assembly is positioned in a first snap-fit feature of the lens; and
sequentially, following movement of the lens in the first direction, moving the lens in a second direction relative to the temple assembly, wherein the moving the lens in the second direction is sufficient for temporary displacement of a first flexible part of the first snap-fit feature by the first complimentary snap-fit feature and temporary displacement of a second flexible part of a second snap-fit feature of the lens by a second complimentary snap-fit feature of the temple assembly, wherein:
the first movement is sufficient for engagement between the second snap-fit feature and the second complimentary snap-fit feature and between the first snap-fit feature and the first complimentary snap-fit feature; and
the first direction is substantially perpendicular to the second direction such that responsive to an impact to an outer surface of the lens, dislodgement between the lens and the temple assembly is prevented by enabling motion of the lens relative to the temple assembly in the first direction and preventing motion of the lens relative to the temple assembly in the second direction.

18. The method of claim 17, wherein
the lens includes a top edge and a lateral edge;
the first direction is towards the top edge of the lens;
the second direction is normal to the lateral edge of the lens;
the first snap-fit feature includes a female snap-fit feature defined in the top edge of the lens,
the first snap-fit feature includes an extended channel that allows motion of the temple assembly in a third direction that is substantially opposite the second direction responsive to an impact on an outer surface of the lens and a ridge that protrudes in the first direction into the extended channel that is configured to maintain the first complimentary snap-fit feature in the extended channel;
the first complimentary snap-fit feature includes a first male snap-fit feature configured to be engaged in the extended channel; and
the second snap-fit feature includes male snap-fit geometry that extends from the lateral edge of the lens, the second snap-fit feature includes two finger-shaped protrusions configured to deflect towards one another to facilitate a snap-fit engagement with a female snap-fit portion of the temple assembly.

19. The method of claim 17, wherein:
the lens includes an outer surface and a lateral edge;
the first direction is towards the outer surface of the lens;
the second direction is normal to the lateral edge of the lens;
the first snap-fit feature includes a FIGURE-8 geometry including two cylindrical portions oriented in a direction and defined in a material of the lens proximate a top edge of the lens;
the first complimentary snap-fit feature includes an engagement feature that includes an end structure that is configured to restrict movement of the lens in the direction normal to the outer surface and to facilitate the snap-fit engagement between the engagement feature and the first snap-fit feature; and
the second snap-fit feature includes male snap-fit geometry that extends from the lateral edge of the lens.

* * * * *